(12) United States Patent
Wassenaar et al.

(10) Patent No.: US 10,836,889 B2
(45) Date of Patent: Nov. 17, 2020

(54) POLYETHYLENE COMPOSITION FOR ARTIFICIAL TURF YARN

(71) Applicant: Total Research & Technology Feluy, Seneffe (BE)

(72) Inventors: Jeroen Wassenaar, Altona (AU); Leen De Groof, Heverlee (BE)

(73) Assignee: Total Research & Technology Feluy, Seneffe (BE)

( * ) Notice: Subject to any disclaimer, the term of this patent is extended or adjusted under 35 U.S.C. 154(b) by 0 days.

(21) Appl. No.: 16/310,501

(22) PCT Filed: Jun. 29, 2017

(86) PCT No.: PCT/EP2017/066086
§ 371 (c)(1),
(2) Date: Dec. 17, 2018

(87) PCT Pub. No.: WO2018/002196
PCT Pub. Date: Jan. 4, 2018

(65) Prior Publication Data
US 2019/0185647 A1    Jun. 20, 2019

(30) Foreign Application Priority Data

Jul. 1, 2016  (EP) .................................... 16177527

(51) Int. Cl.
*C08F 10/02* (2006.01)
*C08L 23/08* (2006.01)
*C08L 23/04* (2006.01)
*D01F 6/04* (2006.01)

(52) U.S. Cl.
CPC ........... *C08L 23/0815* (2013.01); *C08L 23/04* (2013.01); *D01F 6/04* (2013.01); *C08L 2203/12* (2013.01); *C08L 2205/025* (2013.01); *C08L 2205/03* (2013.01); *C08L 2205/035* (2013.01); *C08L 2310/00* (2013.01); *D10B 2321/021* (2013.01); *D10B 2505/202* (2013.01)

(58) Field of Classification Search
CPC ...... C08L 23/0815; C08L 23/06; C08L 23/08; C08L 23/04; C08L 2314/06; C08L 2205/02; C08F 10/02; C08F 4/65912; C08F 4/65916; D01F 6/04

USPC ........................................................ 523/222
See application file for complete search history.

(56) References Cited

U.S. PATENT DOCUMENTS

| | | | |
|---|---|---|---|
| 9,475,926 B2 * | 10/2016 | Akutsu | C08L 23/06 |
| 9,815,228 B2 * | 11/2017 | Maziers | B29C 41/003 |
| 10,335,892 B2 * | 7/2019 | Sigler | B23K 11/185 |
| 10,465,021 B2 * | 11/2019 | Vantomme | C08F 10/02 |
| 2010/0304052 A1 * | 12/2010 | Chai | D01F 6/46 |
| | | | 428/17 |
| 2013/0211018 A1 | 8/2013 | Willocq et al. | |
| 2020/0149193 A1 * | 5/2020 | Geeurickx | C08L 23/06 |

FOREIGN PATENT DOCUMENTS

| | | |
|---|---|---|
| WO | 9303093 A1 | 2/1993 |
| WO | 2008113680 A1 | 9/2008 |
| WO | 2012005974 A1 | 1/2012 |
| WO | 2014012250 A1 | 1/2014 |

OTHER PUBLICATIONS

Advances in carpet manufacture; "Developments in textile sports surfaces" Goswami, K. K., Eds.; Woodhead Publishing Limited, 2009; pp. 102-137.
International Search Report issued in PCT/EP2017/066086, dated Sep. 12, 2017, 3 pages.
Plastics Additives Handbook, ed. H. Zweifel, 5th edition, 2001, Hanser Publishers.

* cited by examiner

*Primary Examiner* — Hannah J Pak
(74) *Attorney, Agent, or Firm* — Albert Shung

(57) ABSTRACT

Disclosed herein is a polyethylene composition which includes 45% to 95% by weight of a metallocene-catalyzed polyethylene A. The polyethylene A has a density ranging from 0.916 g/cm$^3$ to 0.940 g/cm$^3$, and a melt index MI2 of at least 1.5 g/10 min to at most 4.0 g/10 min. The polyethylene composition has at least 5% to at most 55% by weight of a metallocene-catalyzed polyethylene B. The metallocene-catalyzed polyethylene B includes 45% to 75% by weight of a metallocene-catalyzed polyethylene B1. The polyethylene B1 has a density of at most 0.918 g/cm$^3$, a melt index MI2 lower than the melt index MI2 of polyethylene A, and includes 25% to 55% by weight of a metallocene-catalyzed polyethylene B2. The density of polyethylene B2 is higher than the density of polyethylene B1. The melt index MI2 of polyethylene B2 is higher than the melt index MI2 of polyethylene B1.

14 Claims, 3 Drawing Sheets

POLYETHYLENE COMPOSITION FOR ARTIFICIAL TURF YARN

CROSS-REFERENCE TO RELATED APPLICATIONS

This application claims the benefit of PCT/EP2017/066086 filed Jun. 29, 2017, which claims priority from EP 16177527.5 filed Jul. 1, 2016, which are incorporated herein by reference in their entireties for all purposes.

FIELD OF INVENTION

The present invention relates to a polyethylene composition, a process for preparing a polyethylene composition, a fiber comprising a polyethylene composition, a process for preparing a fiber comprising a polyethylene composition, and to artificial turf comprising a polyethylene composition.

BACKGROUND OF THE INVENTION

Artificial turf, also known as artificial grass, synthetic turf, or synthetic grass, is used increasingly as playing surface for sports such as football, hockey, rugby, American football, tennis, lacrosse, golf, and baseball. Compared to natural grass, artificial turf presents a number of benefits relating to increased usage frequency, lower maintenance costs, and lower water consumption (in particular in dry climates). Moreover, artificial turf is also used in so-called landscaping applications where it is used among others for gardens, roundabouts, airports, and playgrounds.

Currently, artificial turf is generally composed of a face yarn that is anchored by tufting into a primary backing. The primary backing is typically a woven textile made from polypropylene. In order to lock the face yarn permanently into the primary backing, a secondary backing material is applied, which typically comprises a latex compound that is applied in liquid state and subsequently cured in an oven after application on the tufted carpet. The artificial turf carpet thus obtained typically rests on a sub base, comprising a drainage system and optionally a shock pad to reduce the impact of players falling onto the artificial turf surface. Sometimes, artificial turf also comprises a granulate infill, typically rubber from recycled tires, that allows players to slide without risk of injury.

Artificial turf was first developed using polyamide as raw material for the face yarn. Despite the good durability of polyamide yarns, these first pitches had limited success due to the high cost of polyamide, and due to the abrasiveness of the surface resulting in injuries of the players. Subsequently, polypropylene was used as a face yarn material, which is cheaper but also suffers from being highly abrasive and is nowadays mainly used for non-contact sports and landscaping applications.

Presently, polyethylene is also used as a face yarn material. Even though polyethylene provides reasonable softness, sliding and ball roll properties, the relatively low resistance to wear, resulting in fibrillation of the individual yarns, and low resilience, which results in flattening of face yarn, severely limits the lifetime. When an artificial turf based on traditional polyethylene is used for example for a football pitch, only a limited lifetime can be guaranteed, and regular maintenance is required. However, from the point of view of the pitch owner (often small clubs, municipalities, or schools) an extended lifetime would lower the operating and replacement costs, and also reduce the environmental impact of the field.

There still remains a need in the industry for a face yarn composition for artificial turf sports fields that provides higher durability and resilience. There still remains a need in the industry for a face yarn composition for artificial turf sports fields that also ensures good softness, thermal resistance, and processing. There still remains a need in the industry for a face yarn composition that allows for down gauging of the yarn titer and pile weight to reduce raw material use and its concomitant environmental impact.

SUMMARY OF THE INVENTION

It is therefore an object of the present invention to provide a polyethylene composition having improved properties suitable for use as artificial turf yarn. The polyethylene composition preferably provides higher durability and resilience, whilst also ensuring good softness, thermal resistance, and processing. The polyethylene composition preferably provides a face yarn composition that allows for down gauging of the yarn titer and pile weight to reduce raw material use and its concomitant environmental impact. The present invention provides the solution to one or more of the aforementioned needs.

According to a first aspect of the present invention, a polyethylene composition is provided. The polyethylene composition comprises:

a) at least 45% to at most 95% by weight of a metallocene-catalyzed polyethylene A, for example at least 50% to at most 95% by weight of polyethylene A, for example at least 55% to at most 95% by weight of polyethylene A, preferably at least 60% to at most 90% by weight of polyethylene A, for example at least 65% to at most 90% by weight of polyethylene A, for example at least 70% to at most 85% by weight of polyethylene A, for example at least 75% to at most 85% by weight of polyethylene A, wherein % by weight is based on the total weight of the polyethylene composition; wherein the density of polyethylene A is at least 0.916 g/cm$^3$ to at most 0.940 g/cm$^3$, as measured according to ISO 1183-2:2004 at a temperature of 23° C.; and wherein the melt index MI2 of polyethylene A is at least 1.5 g/10 min to at most 4.0 g/10 min, for example at least 2.0 g/10 min to at most 3.8 g/10 min, for example at least 2.5 g/10 min to at most 3.6 g/10 min, for example at least 2.8 g/10 min to at most 3.4 g/10 min, as measured according to ISO 1133 Procedure B at a temperature of 190° C. and a load of 2.16 kg;

b) at least 5% to at most 55% by weight of a metallocene-catalyzed polyethylene B, for example at least 5% to at most 50% by weight of polyethylene B, for example at least 5% to at most 45% by weight of polyethylene B, preferably at least 10% to at most 40% by weight of polyethylene B, for example at least 10% to at most 35% by weight of polyethylene B, for example at least 15% to at most 30% by weight of polyethylene B, for example at least 15% to at most 25% by weight of polyethylene B, based on the total weight of the polyethylene composition; wherein said metallocene-catalyzed polyethylene B comprises b1) at least 45% to at most 75% by weight of a metallocene-catalyzed polyethylene B1, wherein % by weight is based on the total weight of the metallocene-catalyzed polyethylene B; wherein the density of polyethylene B1 is at most 0.918 g/cm$^3$, for example at least 0.904 g/cm$^3$, for example at least 0.906 g/cm$^3$, for example at least 0.908 g/cm$^3$, for example at least 0.910 g/cm$^3$, for example at least 0.906 g/cm$^3$, as measured according to ISO 1183-2:2004 at a temperature of 23°

C.; and wherein the melt index MI2 of polyethylene B1 is lower than the melt index MI2 of polyethylene A; and b2) at least 25% to at most 55% by weight of a metallocene-catalyzed polyethylene B2, wherein % by weight is based on the total weight of the metallocene-catalyzed polyethylene B; wherein the density of polyethylene B2 is higher than the density of polyethylene B1; and wherein the melt index MI2 of polyethylene B2 is higher than the melt index MI2 of polyethylene B1.

According to a second aspect, the present invention also encompasses a process for preparing a polyethylene composition, and preferred embodiments thereof, wherein the polyethylene composition is according to the first aspect of the invention and preferred embodiments thereof.

According to a third aspect, the present invention encompasses a fiber, and preferred embodiments thereof, comprising the polyethylene composition according to the first aspect of the invention and preferred embodiments thereof.

According to a fourth aspect, the present invention encompasses a process for preparing a fiber, and preferred embodiments thereof, wherein the fiber is according to the third aspect of the invention and preferred embodiments thereof.

According to a fifth aspect, the present invention encompasses an artificial turf, and preferred embodiments thereof, the artificial turf comprising the polyethylene composition according to the first aspect of the invention and preferred embodiments thereof, for example an artificial turf comprising a fiber, and preferred embodiments thereof, according to the third aspect of the invention and preferred embodiments thereof.

The present invention will now be further described. In the following passages, different aspects of the invention are defined in more detail. Each aspect so defined may be combined with any other aspect or aspects unless clearly indicated to the contrary. In particular, any feature or statement indicated as being preferred or advantageous may be combined with any other features or statements indicated as being preferred or advantageous.

DETAILED DESCRIPTION OF THE INVENTION

Figure 1A:
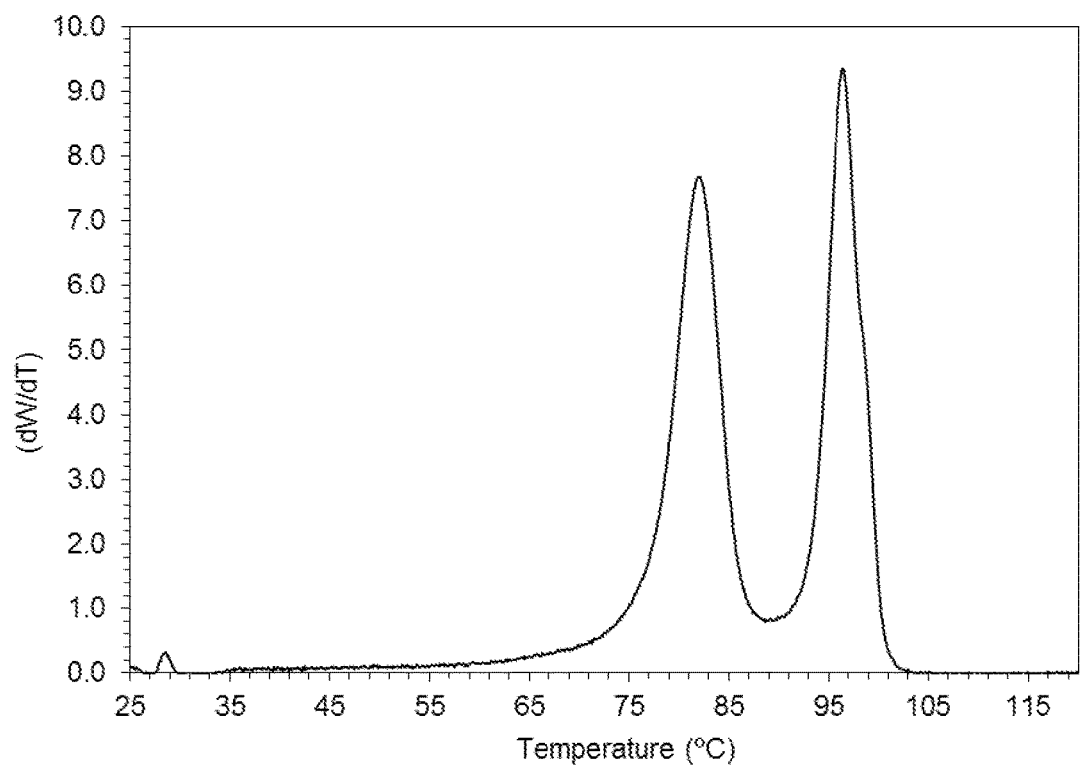
FIG. 1A represents a graph plotting a TREF (temperature rising elution fractionation) profile (dW/dT (%/° C.); elution rate at 1° C./min) as a function of temperature for Lumicene® Supertough 32ST05: Peak 1=81.9; Area=54.8%, Peak 2=96.3° C.; Area 43.7%, Soluble fraction=0.4%.

Before the present polymer resins, processes, articles, and uses encompassed by the invention are described, it is to be understood that this invention is not limited to particular polymer resins, processes, articles, and uses described, as such polymer resins, processes, articles, and uses may, of course, vary. It is also to be understood that the terminology used herein is not intended to be limiting, since the scope of the present invention will be limited only by the appended claims.

Unless otherwise defined, all terms used in disclosing the invention, including technical and scientific terms, have the meaning as commonly understood by one of ordinary skill in the art to which this invention belongs. By means of further guidance, definitions for the terms used in the description are included to better appreciate the teaching of the present invention. When describing the polymer resins, processes, articles, and uses of the invention, the terms used are to be construed in accordance with the following definitions, unless the context dictates otherwise.

As used herein, the singular forms "a", "an", and "the" include both singular and plural referents unless the context clearly dictates otherwise. By way of example, "a resin" means one resin or more than one resin.

The terms "comprising", "comprises" and "comprised of" as used herein are synonymous with "including", "includes" or "containing", "contains", and are inclusive or open-ended and do not exclude additional, non-recited members, elements or method steps. The terms "comprising", "comprises" and "comprised of" also include the term "consisting of".

The recitation of numerical ranges by endpoints includes all integer numbers and, where appropriate, fractions subsumed within that range (e.g. 1 to 5 can include 1, 2, 3, 4 when referring to, for example, a number of elements, and can also include 1.5, 2, 2.75 and 3.80, when referring to, for example, measurements). The recitation of end points also includes the end point values themselves (e.g. from 1.0 to 5.0 includes both 1.0 and 5.0). Any numerical range recited herein is intended to include all sub-ranges subsumed therein.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art. For example, in the following claims and statements, any of the embodiments can be used in any combination.

Preferred statements (features) and embodiments of the polymer resins, processes, articles, and uses of this invention are set herein below. Each statement and embodiment of the invention so defined may be combined with any other statement and/or embodiment, unless clearly indicated to the contrary. In particular, any feature indicated as being preferred or advantageous may be combined with any other features or statements indicated as being preferred or advantageous. Hereto, the present invention is in particular captured by any one or any combination of one or more of the below numbered aspects and embodiments 1 to 52, with any other statement and/or embodiment.

1. A polyethylene composition comprising:
   a) at least 45% to at most 95% by weight of a metallocene-catalyzed polyethylene A, for example at least 50% to at most 95% by weight of polyethylene A, for example at least 55% to at most 95% by weight of polyethylene A, preferably at least 60% to at most 90% by weight of polyethylene A, for example at least 65% to at most 90% by weight of polyethylene A, for example at least 70% to at most 85% by weight of polyethylene A, for example at least 75% to at most 85% by weight of polyethylene A, wherein the % by weight is based on the total weight of the polyethylene composition;
      wherein polyethylene A has a density of at least 0.916 g/cm$^3$ to at most 0.940 g/cm$^3$, as measured according to ISO 1183-2:2004 at a temperature of 23° C.; and and a melt index MI2 of at least 1.5 g/10 min to at most 4.0 g/10 min, for example at least 2.0 g/10 min to at most 3.8 g/10 min, for example at least 2.5 g/10 min to at most 3.6 g/10 min, for example at least 2.8 g/10 min to at most 3.4 g/10 min, as measured according to ISO 1133 Procedure B at a temperature of 190° C. and a load of 2.16 kg;
   b) at least 5% to at most 55% by weight of a metallocene-catalyzed polyethylene B, for example at least 5% to at most 50% by weight of polyethylene B, for example at least 5% to at most 45% by weight of polyethylene B, preferably at least 10% to at most 40% by weight of polyethylene B, for example at least 10% to at most 35% by weight of polyethylene B, for example at least 15% to at most 30% by weight of polyethylene B, for example at least 15% to at most 25% by weight of polyethylene B, wherein % by weight is based on the total weight of the polyethylene composition; wherein said metallocene-catalyzed polyethylene B comprises
      b1) at least 45% to at most 75% by weight of a metallocene-catalyzed polyethylene B1, wherein % by weight is based on the total weight of the metallocene-catalyzed polyethylene B;
         wherein polyethylene B1 has a density of at most 0.918 g/cm$^3$, for example at least 0.904 g/cm$^3$, for example at least 0.906 g/cm$^3$, for example at least 0.908 g/cm$^3$, for example at least 0.910 g/cm$^3$, for example at least 0.906 g/cm$^3$, as measured according to ISO 1183-2:2004 at a temperature of 23° C.; and a melt index MI2 lower than the melt index MI2 of polyethylene A, as measured according to ISO 1133 Procedure B at a temperature of 190° C. and a load of 2.16 kg; and
      b2) at least 25% to at most 55% by weight of a metallocene-catalyzed polyethylene B2, wherein % by weight is based on the total weight of the metallocene-catalyzed polyethylene B;
         wherein polyethylene B2 has a density higher than the density of polyethylene B1, as measured according to ISO 1183-2:2004 at a temperature of 23° C.; and wherein the melt index MI2 of polyethylene B2 is higher than the melt index MI2 of polyethylene B1, as measured according to ISO 1133 Procedure B at a temperature of 190° C. and a load of 2.16 kg.

2. The polyethylene composition according to statement 1, wherein polyethylene B has a multimodal molecular weight distribution, preferably a bimodal molecular weight distribution; and wherein polyethylene B has a density of at least 0.910 g/cm$^3$ to at most 0.945 g/cm$^3$, as measured according to ISO 1183-2:2004 at a temperature of 23° C.; and a melt index MI2 of at least 0.2 g/10 min to at most 1.5 g/10 min, as measured according to ISO 1133 Procedure B at a temperature of 190° C. and a load of 2.16 kg; and a molecular weight distribution $M_w/M_n$ of at least 2.8 to at most 6.0, as measured using gel permeation chromatography, with $M_w$ being the weight-average molecular weight and $M_n$ being the number-average molecular weight.

3. A polyethylene composition comprising:
   a) at least 45% to at most 95% by weight of a metallocene-catalyzed polyethylene A, for example at least 50% to at most 95% by weight of polyethylene A, for example at least 55% to at most 95% by weight of polyethylene A, preferably at least 60% to at most 90% by weight of polyethylene A, for example at least 65% to at most 90% by weight of polyethylene A, for example at least 70% to at most 85% by weight of polyethylene A, for example at least 75% to at most 85% by weight of polyethylene A, wherein % by weight is based on the total weight of the polyethylene composition;
      wherein polyethylene A has a density of at least 0.916 g/cm$^3$ to at most 0.940 g/cm$^3$, as measured according to ISO 1183-2:2004 at a temperature of 23° C.; and a melt index MI2 of polyethylene A is at least 1.5 g/10 min to at most 4.0 g/10 min, for example at least 2.0 g/10 min to at most 3.8 g/10 min, for example at least 2.5 g/10 min to at most 3.6 g/10 min, for example at least 2.8 g/10 min to at most 3.4 g/10 min, as measured according to ISO 1133 Procedure B at a temperature of 190° C. and a load of 2.16 kg; and
   b) at least 5% to at most 55% by weight of a metallocene-catalyzed polyethylene B, for example at least 5% to at most 50% by weight of polyethylene B, for example at least 5% to at most 45% by weight of polyethylene B, preferably at least 10% to at most 40% by weight of polyethylene B, for example at least 10% to at most 35% by weight of polyethylene B, for example at least 15% to at most 30% by weight of polyethylene B, for example at least 15% to at most 25% by weight of polyethylene B, wherein % by weight is based on the total weight of the polyethylene composition:
      wherein polyethylene B has a density of at least 0.910 g/cm$^3$ to at most 0.945 g/cm$^3$, as measured according to ISO 1183-2:2004 at a temperature of 23° C.; and a melt index MI2 of at least 0.2 g/10 min to at most 1.5 g/10 min, as measured according to ISO 1133 Procedure B at a temperature of 190° C. and a load of 2.16 kg; and a molecular weight distribution $M_w/M_n$ of at least 2.8 to at most 6.0, as measured using gel permeation chromatography, with $M_w$ being the weight-average molecular weight and $M_n$ being the number-average molecular weight, wherein said metallocene-catalyzed polyethylene B has a multimodal molecular weight distribution, preferably a bimodal molecular weight distribution.

4. The polyethylene composition according to statement 3, wherein polyethylene B has a multimodal molecular weight distribution, preferably a bimodal molecular weight distribution, and comprises:
   b1) at least 45% to at most 75% by weight of a metallocene-catalyzed polyethylene B1, wherein % by weight is based on the total weight of the polyethylene B;
      wherein polyethylene B1 has a density of at most 0.918 g/cm$^3$, as measured according to ISO 1183-2:2004 at a temperature of 23° C.; and a melt index MI2 lower than the melt index MI2 of polyethylene A, as measured according to ISO 1133 Procedure B at a temperature of 190° C. and a load of 2.16 kg; and b2) at least 25% to at most 55% by weight of a metallocene-catalyzed polyethylene B2, wherein % by weight is based on the total weight of the polyethylene B;

wherein polyethylene B2 has a density higher than the density of polyethylene B1, as measured according to ISO 1183-2:2004 at a temperature of 23° C.; and wherein the melt index MI2 of polyethylene B2 is higher than the melt index MI2 of polyethylene B1, as measured according to ISO 1133 Procedure B at a temperature of 190° C. and a load of 2.16 kg.

5. A monofilament, slit film or tape comprising a polyethylene composition according to any one of statements 1 to 4.

6. The polyethylene composition according to any one of statements 1 to 4, or the monofilament, slit film, or tape according to statement 5, wherein polyethylene A has a monomodal molecular weight distribution.

7. The polyethylene composition according to any one of statements 1 to 4, or 6, or the monofilament, slit film, or tape according to any one of statement 5 to 6, wherein the polyethylene composition comprises at least 45% to at most 90% by weight of polyethylene A, preferably at least 45% to at most 85% by weight of polyethylene A, more preferably at least 49% to at most 84% by weight of polyethylene A, wherein % by weight is based on the total weight of the polyethylene composition.

8. The polyethylene composition according to any one of statements 1 to 4, 6 to 7, or the monofilament, slit film, or tape according to any one of statements 5 to 7, wherein polyethylene A has a density, as measured according to ISO 1183-2:2004 at a temperature of 23° C., of at least 0.916 g/cm$^3$ to at most 0.939 g/cm$^3$, preferably of at least 0.920 g/cm$^3$ to at most 0.938 g/cm$^3$, preferably of at least 0.924 g/cm$^3$ to at most 0.937 g/cm$^3$, preferably of at least 0.928 g/cm$^3$ to at most 0.936 g/cm$^3$, preferably of at least 0.932 g/cm$^3$ to at most 0.935 g/cm$^3$.

9. The polyethylene composition according to any one of statements 1 to 4, 6 to 8, or the monofilament, slit film, or tape according to any one of statements 5 to 8, wherein polyethylene A has a molecular weight distribution $M_w/M_n$ of at least 2.0 to at most 6.0, for example at most 5.0, for example at most 4.0, preferably the molecular weight distribution $M_w/M_n$ of polyethylene A is at least 2.0 to at most 3.5, as measured using gel permeation chromatography, with $M_w$ being the weight-average molecular weight and $M_n$ being the number-average molecular weight.

10. The polyethylene composition according to any one of statements 1 to 4, 6 to 9, or the monofilament, slit film, or tape according to any one of statements 5 to 9, wherein the rheology long chain branching index $g_{rheo}$ of polyethylene A is at most 0.9, preferably the $g_{rheo}$ of polyethylene A is at most 0.85.

11. The polyethylene composition according to any one of statements 1 to 4, 6 to 10, or the monofilament, slit film, or tape according to any one of statements 5 to 10, wherein the Composition Distribution Constant (CDC) of polyethylene A is at least 150, preferably at least 160, preferably at least 170, preferably at least 180, more preferably at least 190, as analyzed by TREF using for example a cooling rate of 1° C./hour, optionally wherein the soluble fraction of polyethylene A is at most 1.00%, preferably at most 0.75%, more preferably at most 0.50%, as analyzed by TREF using for example a cooling rate of 1° C./hour.

12. The polyethylene composition according to any one of statements 1 to 4, 6 to 11, or the monofilament, slit film, or tape according to any one of statements 5 to 11, wherein the Vicat softening temperature $T_v$ of polyethylene A expressed in ° C., as measured according to ISO 306:2013 method A120, satisfies the relationship Tv>825×d−654, wherein d is the density expressed in g/cm$^3$, as measured according to ISO 1183-2:2004 at a temperature of 23° C.

13. The polyethylene composition according to any one of statements 1 to 4, 6 to 12, or the monofilament, slit film, or tape according to any one of statements 5 to 12, wherein polyethylene A is an ethylene copolymer with a $C_4$-$C_{12}$ alpha-olefin comonomer, preferably wherein the $C_4$-$C_{12}$ alpha-olefin is selected from the group comprising 1-butene, 1-hexene, 4-methyl-1-pentene, 3-methyl-1-butene, and 1-octene, most preferably wherein the $C_4$-$C_{12}$ alpha-olefin is 1-hexene.

14. The polyethylene composition according to any one of statements 1 to 4, 6 to 13, or the monofilament, slit film, or tape according to any one of statements 5 to 13, wherein polyethylene A has a comonomer content of at most 30% by weight, preferably of at most 20% by weight, preferably of at most 15% by weight, preferably of at most 10% by weight, preferably of at most 5% by weight, as measured according to NMR, wherein % by weight is based on the total weight of polyethylene A.

15. The polyethylene composition according to any one of statements 1, 2, 4, 6 to 14, or the monofilament, slit film, or tape according to any one of statements 5 to 14, wherein polyethylene B1 has a melt index MI2 of at most 1.0 g/10 min, preferably at most 0.50 g/10 min, more preferably at most 0.10 g/10 min, as measured according to ISO 1133 Procedure B at a temperature of 190° C. and a load of 2.16 kg.

16. The polyethylene composition according to any one of statements 1, 2, 4, 6 to 15, or the monofilament, slit film, or tape according to any one of statements 5 to 15, wherein polyethylene B1 has a melt index MI2 of at least 0.01 g/10 min, preferably of at least 0.02 g/10 min, as measured according to ISO 1133 Procedure B at a temperature of 190° C. and a load of 2.16 kg.

17. The polyethylene composition according to any one of statements 1, 2, 4, 6 to 16, or the monofilament, slit film, or tape according to any one of statements 5 to 16, wherein polyethylene B1 has a monomodal molecular weight distribution.

18. The polyethylene composition according to any one of statements 1, 2, 4, 6 to 17, or the monofilament, slit film, or tape according to any one of statements 5 to 17, wherein polyethylene B1 is an ethylene copolymer with a $C_4$-$C_{12}$ alpha-olefin comonomer, preferably wherein the $C_4$-$C_{12}$ alpha-olefin is selected from the group comprising 1-butene, 1-hexene, 4-methyl-1-pentene, 3-methyl-1-butene, and 1-octene, most preferably wherein the $C_4$-$C_{12}$ alpha-olefin is 1-hexene.

19. The polyethylene composition according to any one of statements 1, 2, 4, 6 to 18, or the monofilament, slit film, or tape according to any one of statements 5 to 18, wherein polyethylene B1 has a comonomer content of at most 30% by weight, preferably of at most 20% by weight, more preferably of at most 15% by weight, as measured according to NMR, based on the total weight of polyethylene B1.

20. The polyethylene composition according to any one of statements 1, 2 4, 6 to 19, or the monofilament, slit film, or tape according to any one of statements 5 to 19, wherein polyethylene B1 has a density of at least 0.905 g/cm³, preferably of at least 0.908 g/cm³, preferably of at least 0.909 g/cm³, as measured according to ISO 1183-2:2004 at a temperature of 23° C.

21. The polyethylene composition according to any one of statements 1, 2, 4, 6 to 20, or the monofilament, slit film, or tape according to any one of statements 5 to 20, wherein polyethylene B2 has a monomodal molecular weight distribution.

22. The polyethylene composition according to any one of statements 1, 2, 4, 6 to 21, or the monofilament, slit film, or tape according to any one of statements 5 to 21, wherein polyethylene B2 is an ethylene homopolymer.

23. The polyethylene composition according to any one of statements 1, 2, 4, 6 to 22, or the monofilament, slit film, or tape according to any one of statements 5 to 22, wherein polyethylene B2 has a MI2 of at least 0.5 g/10 min, preferably at least 0.8 g/10 min, preferably at least 1 g/10 min, more preferably at least 5 g/10 min, even more preferably at least 10 g/10 min, as measured according to ISO 1133 Procedure B at a temperature of 190° C. and a load of 2.16 kg.

24. The polyethylene composition according to any one of statements 1, 2, 4, 6 to 23, or the monofilament, slit film, or tape according to any one of statements 5 to 23, wherein polyethylene B2 has a MI2 of at most 200 g/10 min, preferably at most 155 g/10 min, preferably at most 100 g/10 min, for example at least 5 g/10 min to at most 150 g/10 min, for example at least 10 g/10 min to at most 100 g/10 min, as measured according to ISO 1133 Procedure B at a temperature of 190° C. and a load of 2.16 kg.

25. The polyethylene composition according to any one of statements 1, 2 4, 6 to 24, or the monofilament, slit film, or tape according to any one of statements 5 to 24, wherein polyethylene B2 has a density of at least 0.920 g/cm³, preferably at least 0.923 g/cm³, preferably at least 0.925 g/cm³, for example at least 0.926 g/cm³, preferably of at least 0.927 g/cm³, preferably of at least 0.928 g/cm³, preferably at least 0.930 g/cm³, preferably of at most 0.962 g/cm³ and even more preferably of at most 0.960 g/cm³; most preferably it is of about 0.927 g/cm³ to 0.958 g/cm³, as measured according to ISO 1183-2:2004 at a temperature of 23° C.

26. The polyethylene composition according to any one of statements 1, 2, 4, 6 to 25, or the monofilament, slit film, or tape according to any one of statements 5 to 25, wherein the ratio of the $M_w$ of polyethylene B1/$M_w$ of polyethylene B2 is at least 2.5 to at most 6.0, as measured using gel permeation chromatography, with $M_w$ being the weight-average molecular weight.

27. The polyethylene composition according to any one of statements 1, 2, 4, 6 to 26, or the monofilament, slit film, or tape according to any one of statements 5 to 26, wherein polyethylene B has a multimodal molecular weight distribution, preferably wherein polyethylene B has a bimodal molecular weight distribution.

28. The polyethylene composition according to any one of statements 1 to 4, 6 to 27, or the monofilament, slit film, or tape according to any one of statements 5 to 27, wherein polyethylene B is an ethylene copolymer with a $C_4$-$C_{12}$ alpha-olefin comonomer, preferably wherein the $C_4$-$C_{12}$ alpha-olefin is selected from the group comprising 1-butene, 1-hexene, 4-methyl-1-pentene, 3-methyl-1-butene, and 1-octene, most preferably wherein the $C_4$-$C_{12}$ alpha-olefin is 1-hexene.

29. The polyethylene composition according to any one of statements 1 to 4, 6 to 28, or the monofilament, slit film, or tape according to any one of statements 5 to 28, wherein polyethylene B has a comonomer content of at most 30% by weight, preferably of at most 20% by weight, preferably of at most 15% by weight, preferably of at most 10% by weight, as measured according to NMR, wherein % by weight is based on the total weight of polyethylene B.

30. The polyethylene composition according to any one of statements 1 to 4, 6 to 29, or the monofilament, slit film, or tape according to any one of statements 5 to 29, wherein the polyethylene composition comprises at least 5% to at most 55% by weight of polyethylene B, preferably at least 8% to at most 55% by weight, preferably at least 10% to at most 55% by weight, preferably at least 11% to at most 55% by weight, preferably at least 12% to at most 55% by weight, preferably at least 13% to at most 55% by weight, wherein % by weight is based on the total weight of the polyethylene composition.

31. The polyethylene composition according to any one of statements 1, 2, 4, 6 to 30, or the monofilament, slit film, or tape according to any one of statements 5 to 30, wherein polyethylene B comprises at least 48% to at most 70% by weight of polyethylene B1, preferably at least 50% to at most 65% by weight of polyethylene B1, preferably at least 55% to at most 60% by weight of polyethylene B1, wherein % by weight is based on the total weight of polyethylene B.

32. The polyethylene composition according to any one of statements 1, 2, 4, 6 to 31, or the monofilament, slit film, or tape according to any one of statements 5 to 31, wherein polyethylene B comprises at least 30% to at most 50% by weight of polyethylene B2, preferably at least 35% to at most 48% by weight of polyethylene B2, preferably at least 38% to at most 45% by weight of polyethylene B2, based on the total weight of polyethylene B.

33. The polyethylene composition according to any one of statements 1 to 4, 6 to 32, or the monofilament, slit film, or tape according to any one of statements 5 to 32, wherein the rheology long chain branching index $g_{rheo}$ of polyethylene B is at most 0.9.

34. The polyethylene composition according to any one of statements 1 to 4, 6 to 33, or the monofilament, slit film, or tape according to any one of statements 5 to 33, wherein the Composition Distribution Constant (CDC) of polyethylene B is at least 50, preferably at least 60, preferably at least 70, as analyzed by TREF (cooling rate of 1° C./hour), optionally wherein the soluble fraction of polyethylene B is at most 1.00%, preferably at most 0.75%, more preferably at most 0.50%, as analyzed by TREF (cooling rate of 1° C./hour).

35. The polyethylene composition according to any one of statements 1 to 4, 6 to 34, or the monofilament, slit film, or tape according to any one of statements 5 to 34, wherein the Composition Distribution Constant (CDC) of polyethylene B is at most 150, preferably at most 140, preferably at most 130, as analyzed by TREF under (cooling rate of 1° C./hour), optionally wherein the soluble fraction of polyethylene B is at most 1.00%, preferably at most 0.75%, more preferably at most 0.50%, as analyzed by TREF (cooling rate of 1° C./hour).

36. The polyethylene composition according to any one of statements 1 to 4, 6 to 35, or the monofilament, slit film, or tape according to any one of statements 5 to 35, wherein the Vicat softening temperature $T_v$ of polyethylene B expressed in ° C., as measured according to ISO 306:2013 method A120, satisfies the relationship Tv>825×d−654, wherein d is the density expressed in g/cm$^3$, as measured according to ISO 1183-2:2004 at a temperature of 23° C.

37. The polyethylene composition according to any one of statements 1 to 4, 6 to 36, or the monofilament, slit film, or tape according to any one of statements 5 to 36, wherein the density of polyethylene B is at least 0.915 g/cm$^3$ to at most 0.940 g/cm$^3$, preferably at least 0.918 g/cm$^3$ to at most 0.937 g/cm$^3$, preferably at least 0.920 g/cm$^3$ to at most 0.935 g/cm$^3$, as measured according to ISO 1183-2:2004 at a temperature of 23° C.

38. The polyethylene composition according to any one of statements 1 to 4, 6 to 37 or the monofilament, slit film, or tape according to any one of statements 5 to 37, wherein the polyethylene composition comprises at least 0.01% to at most 10% by weight of a polyethylene-based composition C, wherein the polyethylene-based composition C comprises one or more additives selected from the group comprising antioxidants, UV stabilizers, pigments, processing aids, acid scavengers, lubricants, antistatic agents, fillers, nucleating agents, or clarifying agents, based on the total weight of the polyethylene composition.

39. The polyethylene composition according to any one of statements 1 to 4, 6 to 38, or the monofilament, slit film, or tape according to any one of statements 5 to 38, wherein the melt index MI2 of the polyethylene composition is at least 0.5 g/10 min to at most 4.5 g/10 min, preferably at least 0.8 g/10 min to at most 4.0 g/10 min, preferably 1.0 g/10 min to at most 3.5 g/10 min, as measured according to ISO 1133 Procedure B at a temperature of 190° C. and a load of 2.16 kg.

40. The polyethylene composition according to any one of statements 1 to 4, 6 to 39, or the monofilament, slit film, or tape according to any one of statements 5 to 39, wherein the melt index MI2 of the blend of polyethylene A and B is at least 0.5 g/10 min to at most 4.5 g/10 min, preferably at least 0.8 g/10 min to at most 4.0 g/10 min, preferably 1.0 g/10 min to at most 3.5 g/10 min, as measured according to ISO 1133 Procedure B at a temperature of 190° C. and a load of 2.16 kg.

41. The polyethylene composition according to any one of statements 1 to 4, 6 to 40, or the monofilament, slit film, or tape according to any one of statements 5 to 40, wherein the density of the polyethylene composition is at least 0.916 g/cm$^3$ to at most 0.940 g/cm$^3$, preferably at least 0.920 g/cm$^3$ to at most 0.940 g/cm$^3$, as measured according to ISO 1183-2:2004 at a temperature of 23° C.

42. The polyethylene composition according to any one of statements 1 to 4, 6 to 41, or the monofilament, slit film, or tape according to any one of statements 5 to 41, wherein the density of the blend of polyethylene A and B is at least 0.916 g/cm$^3$ to at most 0.940 g/cm$^3$, preferably at least 0.920 g/cm$^3$ to at most 0.940 g/cm$^3$, as measured according to ISO 1183-2:2004 at a temperature of 23° C.

43. A process for preparing a polyethylene composition according to any one of statements 1 to 4, 6 to 42, or the monofilament, slit film, or tape according to any one of statements 5 to 42, wherein the process comprises the steps of:
   i) providing a metallocene-catalyzed polyethylene A;
   ii) providing a metallocene-catalyzed polyethylene B;
   iii) blending polyethylene A, and B to form a polyethylene composition according to any one of statements 1 to 4, 6 to 42, or to form a monofilament, slit film, or tape according to any one of statements 5 to 42.

44. The process according to statement 43, wherein metallocene-catalyzed polyethylene B is prepared in a process comprising the steps of:
   a) providing a metallocene-catalyzed polyethylene B2;
   b) providing a metallocene-catalyzed polyethylene B1;
   c) blending polyethylene B1 and B2 into a polyethylene B.

45. The process according to statement 43, wherein metallocene-catalyzed polyethylene B is prepared in a process comprising the steps of:
   preparing a metallocene-catalyzed polyethylene B2;
   preparing a metallocene-catalyzed polyethylene B1, in the presence of B2; thereby obtaining a polyethylene B.

46. The process according to any one of statements 43 to 45, wherein said blending is performed through physically blending the polyethylene, for example through melt blending the polyethylene.

47. The process according to any one of statements 43 to 46, wherein said metallocene-catalyzed polyethylene B is prepared by chemically blending, for example by polymerizing the polyethylene in one or more reactors, preferably in at least two reactors connected in series.

48. Use of the polyethylene composition according to any one of statements 1 to 4, 6 to 42 for preparing a fiber, preferably wherein the fiber is selected from the group comprising: monofilament, slit film, or tape.

49. A fiber comprising the polyethylene composition according to any one of statements 1 to 4, 6 to 42, preferably wherein the fiber is selected from the group comprising monofilament, slit film, or tape.

50. The fiber, for example monofilament, slit film, or tape, according to any one of statements 5 to 42, or 49, which has a draw ratio of at least 1:3 to at most 1:8, preferably of at least 1:3 to at most 1:6, more preferably of at least 1:4 to at most 1:5.

51. Use of the fiber, preferably wherein the fiber is selected from the group comprising: monofilament, slit film, or tape, according to any one of statements 5 to 42, or according to any one of statements 49 or 50 to prepare an artificial turf face yarn.

52. An artificial turf comprising the fiber, preferably wherein the fiber is selected from the group comprising: monofilament, slit film, or tape, according to any one of statements 5 to 42, or according to any one of statements 49 or 50.

Throughout the present application the terms "polyethylene" and "polyethylene polymer" may be used synonymously.

Throughout the present application the terms "forming" and "shaping" may be used synonymously.

The term "polyethylene resin" as used herein refers to the polyethylene fluff or powder that is extruded, and/or melted, and/or pelleted and can be prepared through compounding and homogenizing of the polyethylene resin as taught herein, for instance, with mixing and/or extruder equipment. Unless otherwise stated, all parameters used to define the polyethylene resin or one of the polyethylene fractions, are as measured on polyethylene pellets.

The term "fluff" or "powder" as used herein refers to the polyethylene material with the solid catalyst particle at the core of each grain and is defined as the polymer material after it exits the polymerization reactor (or final polymerization reactor in the case of multiple reactors connected in series). The term "pellets" refers to the polyethylene resin that has been pelletized, for example through melt extrusion. As used herein, the terms "extrusion" or "extrusion process", "pelletization" or "pelletizing" are used herein as synonyms and refer to the process of transforming polyolefin resin into a "polyolefin product" or into "pellets" after pelletizing. The process of pelletization preferably comprises several devices connected in series, including one or more rotating screws in an extruder, a die, and means for cutting the extruded filaments into pellets.

As used herein, the term "comonomer" refers to olefin comonomers which are suitable for being polymerized with alpha-olefin monomer. Comonomers may comprise but are not limited to aliphatic $C_3$-$C_{20}$ alpha-olefins, preferably $C_4$-$C_{12}$ alpha-olefins. Examples of suitable aliphatic $C_3$-$C_{20}$ alpha-olefins include propylene, 1-butene, 1-pentene, 4-methyl-1-pentene, 1-hexene, 1-octene, 1-decene, 1-dodecene, 1-tetradecene, 1-hexadecene, 1-octadecene, and 1-eicosene. In some preferred embodiments, said comonomer is 1-hexene.

The term "ethylene copolymer" as used herein is intended to encompass polymers which consist essentially of repeat units deriving from ethylene and at least one other $C_3$-$C_{20}$ alpha olefin comonomer, preferably wherein the comonomer is 1-hexene. The term "ethylene homopolymer" as used herein is intended to encompass polymers which consist essentially of repeat units deriving from ethylene. Homopolymers may, for example, comprise at least 99.8% preferably 99.9% by weight of repeats units derived from ethylene, as determined for example by $^{13}C$ NMR spectrometry.

As used herein, the term "monomodal polyethylene" or "polyethylene with a monomodal molecular weight distribution" refers to polyethylene having one maximum in their molecular weight distribution curve, which is also defined as a unimodal distribution curve. As used herein, the term "polyethylene with a bimodal molecular weight distribution" or "bimodal polyethylene" it is meant, polyethylene having a distribution curve being the sum of two unimodal molecular weight distribution curves, and refers to a polyethylene product having two distinct but possibly overlapping populations of polyethylene macromolecules each having different weight average molecular weights. By the term "polyethylenes with a multimodal molecular weight distribution" or "multimodal polyethylenes" it is meant polyethylenes with a distribution curve being the sum of at least two, preferably more than two unimodal distribution curves, and refers to a polyethylene product having two or more distinct but possibly overlapping populations of polyethylene macromolecules each having different weight average molecular weights. The multimodal polyethylene can have an "apparent monomodal" molecular weight distribution, which is a molecular weight distribution curve with a single peak and no shoulder. Nevertheless, the polyethylene will still be multimodal if it comprises two distinct populations of polyethylene macromolecules each having a different weight average molecular weights, as defined above, for example when the two distinct populations were prepared in different reactors and/or under different conditions and/or with different catalysts.

Polyethylene having a multimodal molecular weight distribution can be obtained by chemical or physical blending of at least two polyethylene fractions having different molecular weight distribution. In some embodiments, polyethylene having multimodal molecular weight distribution can be obtained by blending at the polyethylene particle level wherein the different fractions of polyethylene can be obtained by operating two reactors under different polymerization conditions and transferring the first fraction to the second reactor, i.e. the reactors are connected in series. The term "chemical blending" as used herein means that one grain of catalyst passes through at least two reactors in different operating conditions. The polymer produced in the second reactor is homogeneously diffused into the polymer that has been produced in the first reactor. This level of homogeneity cannot be reached in a physical blend when pellets of two different products (typically formed from two separate catalysts in two separate reactors) are physically blended in an extruder.

The metallocene-catalyzed polyethylene for use in the compositions of the invention can be produced by polymerizing ethylene and one or more optional comonomers, optionally hydrogen, in the presence of at least one metallocene catalyst system. Metallocene catalysts insert the monomer in a homogeneous way, i.e. independent of the molecular weight of the molecular chain; whereas ZN-catalysts have a tendency to insert the comonomer preferentially in the lower molecular weight part, where it has little effect on the mechanical properties. Metallocene-catalyzed polyethylene (mPE) therefore has better stress crack resistance, fibrillation resistance, etc. Since all two or three polyethylene fractions (A, B, B1, B2) are metallocene-catalyzed, the monomer is inserted homogeneously in each fraction, leading to improved crack resistance and fibrillation resistance properties for each fraction, and for the composition as a whole. For the present applications, blends comprising ZN-catalyzed fractions were found to have inferior properties.

As used herein, the term "catalyst" refers to a substance that causes a change in the rate of a polymerization reaction. It is especially applicable to catalysts suitable for the polymerization of ethylene to polyethylene. The present invention especially concerns polyethylene prepared in the presence of a metallocene catalysts system. As used herein, the terms "metallocene-catalyzed polyethylene resin", and "metallocene-catalyzed polyethylene" are synonymous and used interchangeably and refers to a polyethylene prepared in the presence of a metallocene catalyst.

The term "metallocene catalyst" or "metallocene" for short is used herein to describe any transition metal complexes comprising metal atoms bonded to one or more ligands. The preferred metallocene catalysts are compounds of Group IV transition metals of the Periodic Table such as titanium, zirconium, hafnium, etc., and have a coordinated structure with a metal compound and ligands composed of one or two groups of cyclopentadienyl, indenyl, fluorenyl or their derivatives. The structure and geometry of the metallocene can be varied to adapt to the specific need of the producer depending on the desired polymer. Metallocenes typically comprise a single metal site, which allows for more control of branching and molecular weight distribution of the polymer. Monomers are inserted between the metal and the growing chain of polymer.

Preferably the metallocene catalyst system used for preparing polyethylene A, B1, B2 and B, comprises a compound of formula (I) or (II)

$$(Ar)_2MQ_2 \tag{I};$$

or $$R''(Ar)_2MQ_2 \tag{II},$$

wherein the metallocenes according to formula (I) are non-bridged metallocenes and the metallocenes according to formula (II) are bridged metallocenes;

wherein said metallocene according to formula (I) or (II) has two Ar bound to M which can be the same or different from each other;

wherein Ar is an aromatic ring, group or moiety and wherein each Ar is independently selected from the group consisting of cyclopentadienyl, indenyl (IND), tetrahydroindenyl (THI), and fluorenyl, wherein each of said groups may be optionally substituted with one or more substituents each independently selected from the group consisting of halogen, hydrosilyl, a hydrocarbyl having 1 to 20 carbon atoms, and SiR'''$_3$ wherein R''' is a hydrocarbyl having 1 to 20 carbon atoms; and wherein said hydrocarbyl optionally contains one or more atoms selected from the group comprising B, Si, S, O, F, Cl, and P;

wherein M is a transition metal selected from the group consisting of titanium, zirconium, hafnium, and vanadium; and preferably is zirconium;

wherein each Q is independently selected from the group consisting of halogen, a hydrocarboxy having 1 to 20 carbon atoms, and a hydrocarbyl having 1 to 20 carbon atoms and wherein said hydrocarbyl optionally contains one or more atoms selected from the group comprising B, Si, S, O, F, Cl, and P; and wherein R" is a divalent group or moiety bridging the two Ar groups and selected from the group consisting of $C_1$-$C_{20}$ alkylene, germanium, silicon, siloxane, alkylphosphine, and an amine, and wherein said R" is optionally substituted with one or more substituents each independently selected from the group consisting of halogen, hydrosilyl, a hydrocarbyl having 1 to 20 carbon atoms, and SiR$_3$ wherein R is a hydrocarbyl having 1 to 20 carbon atoms; and wherein said hydrocarbyl optionally contains one or more atoms selected from the group comprising B, Si, S, O, F, Cl, and P.

Preferably, the metallocene comprises a bridged bis-indenyl and/or a bridged bis-tetrahydrogenated indenyl component. In an embodiment, the metallocene can be selected from one of the following formula (IIIa) or (IIIb):

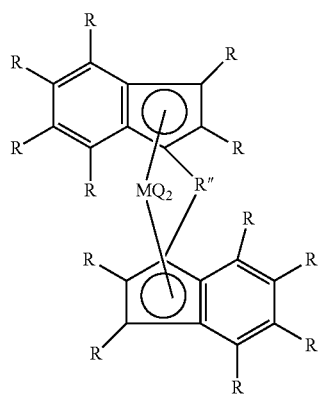

(IIIa)

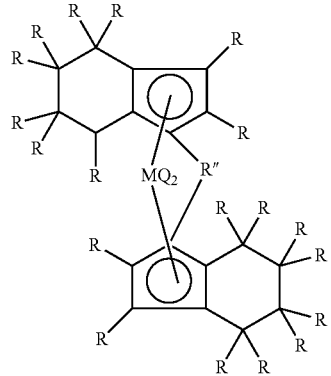

(IIIb)

wherein each R in formula (IIIa) or (IIIb) is the same or different and is selected independently from hydrogen or XR'$_v$ in which X is chosen from Group 14 of the Periodic Table (preferably carbon), oxygen or nitrogen and each R' is the same or different and is chosen from hydrogen or a hydrocarbyl of from 1 to 20 carbon atoms and v+1 is the valence of X, preferably R is a hydrogen, methyl, ethyl, n-propyl, iso-propyl, n-butyl, tert-butyl group; R" is a structural bridge between the two indenyl or tetrahydrogenated indenyls that comprises a C1-C4 alkylene radical, a dialkyl germanium, silicon or siloxane, or an alkyl phosphine or amine radical; Q is a hydrocarbyl radical having from 1 to 20 carbon atoms or a halogen, preferably Q is F, Cl or Br; and M is a transition metal from Group 4 of the Periodic Table or vanadium.

Each indenyl or tetrahydro indenyl component may be substituted with R in the same way or differently from one another at one or more positions of either of the fused rings. Each substituent is independently chosen. If the cyclopentadienyl ring is substituted, its substituent groups are preferably not so bulky so as to affect coordination of the olefin monomer to the metal M. Any substituents XR'v on the cyclopentadienyl ring are preferably methyl. More preferably, at least one and most preferably both cyclopentadienyl rings are unsubstituted. In a particularly preferred embodiment, the metallocene comprises a bridged unsubstituted bis-indenyl and/or bis-tetrahydrogenated indenyl i.e. all R are hydrogens. More preferably, the metallocene comprises a bridged unsubstituted bis-tetrahydrogenated indenyl.

Illustrative examples of metallocene catalysts comprise but are not limited to bis(cyclopentadienyl) zirconium dichloride (Cp$_2$ZrCl$_2$), bis(cyclopentadienyl) titanium dichloride (Cp$_2$TiCl$_2$), bis(cyclopentadienyl) hafnium dichloride (Cp$_2$HfCl$_2$); bis(tetrahydroindenyl) zirconium dichloride, bis(indenyl) zirconium dichloride, and bis(n-butyl-cyclopentadienyl) zirconium dichloride; ethylenebis (4,5,6,7-tetrahydro-1-indenyl) zirconium dichloride, ethylenebis(1-indenyl) zirconium dichloride, dimethylsilylene bis(2-methyl-4-phenyl-inden-1-yl) zirconium dichloride, diphenylmethylene (cyclopentadienyl)(fluoren-9-yl) zirconium dichloride, and dimethylmethylene [1-(4-tert-butyl-2-methyl-cyclopentadienyl)](fluoren-9-yl) zirconium dichloride. Most preferably the metallocene is ethylene-bis (tetrahydroindenyl)zirconium dichloride or ethylene-bis (tetrahydroindenyl) zirconium difluoride.

As used herein, the term "hydrocarbyl having 1 to 20 carbon atoms" refers to a moiety selected from the group comprising a linear or branched $C_1$-$C_{20}$ alkyl; $C_3$-$C_{20}$ cycloalkyl; $C_6$-$C_{20}$ aryl; $C_7$-$C_{20}$ alkylaryl and $C_7$-$C_{20}$ arylalkyl, or any combinations thereof. Exemplary hydrocarbyl groups are methyl, ethyl, propyl, butyl, amyl, isoamyl, hexyl, isobutyl, heptyl, octyl, nonyl, decyl, cetyl, 2-ethylhexyl, and phenyl.

As used herein, the term "hydrocarboxy having 1 to 20 carbon atoms" refers to a moiety with the formula hydrocarbyl-O—, wherein the hydrocarbyl has 1 to 20 carbon atoms as described herein. Preferred hydrocarboxy groups are selected from the group comprising alkyloxy, alkenyloxy, cycloalkyloxy or aralkoxy groups.

As used herein, the term "alkyl", by itself or as part of another substituent, refers to straight or branched saturated hydrocarbon group joined by single carbon-carbon bonds having 1 or more carbon atom, for example 1 to 12 carbon atoms, for example 1 to 6 carbon atoms, for example 1 to 4 carbon atoms. When a subscript is used herein following a carbon atom, the subscript refers to the number of carbon atoms that the named group may contain. Thus, for example, $C_{1-12}$alkyl means an alkyl of 1 to 12 carbon atoms. Examples of alkyl groups are methyl, ethyl, propyl, isopropyl, butyl, isobutyl, sec-butyl, tert-butyl, 2-methylbutyl, pentyl and its chain isomers, hexyl and its chain isomers, heptyl and its chain isomers, octyl and its chain isomers, nonyl and its chain isomers, decyl and its chain isomers, undecyl and its chain isomers, dodecyl and its chain isomers. Alkyl groups have the general formula $C_nH_{2n+1}$.

As used herein, the term "cycloalkyl", by itself or as part of another substituent, refers to a saturated or partially saturated cyclic alkyl radical. Cycloalkyl groups have the general formula $C_nH_{2n-1}$. When a subscript is used herein following a carbon atom, the subscript refers to the number of carbon atoms that the named group may contain. Thus, examples of $C_{3-6}$cycloalkyl include cyclopropyl, cyclobutyl, cyclopentyl, or cyclohexyl.

As used herein, the term "aryl", by itself or as part of another substituent, refers to a radical derived from an aromatic ring, such as phenyl, naphthyl, indanyl, or 1,2,3,4-tetrahydro-naphthyl. When a subscript is used herein following a carbon atom, the subscript refers to the number of carbon atoms that the named group may contain.

As used herein, the term "alkylaryl", by itself or as part of another substituent, refers to refers to an aryl group as defined herein, wherein a hydrogen atom is replaced by an alkyl as defined herein. When a subscript is used herein following a carbon atom, the subscript refers to the number of carbon atoms that the named group or subgroup may contain.

As used herein, the term "arylalkyl", by itself or as part of another substituent, refers to refers to an alkyl group as defined herein, wherein a hydrogen atom is replaced by an aryl as defined herein. When a subscript is used herein following a carbon atom, the subscript refers to the number of carbon atoms that the named group may contain. Examples of $C_{6-10}$aryl$C_{1-6}$alkyl radicals include benzyl, phenethyl, dibenzylmethyl, methylphenylmethyl, 3-(2-naphthyl)-butyl, and the like.

As used herein, the term "alkylene", by itself or as part of another substituent, refers to alkyl groups that are divalent, i.e. with two single bonds for attachment to two other groups. Alkylene groups may be linear or branched and may be substituted as indicated herein. Non-limiting examples of alkylene groups include methylene (—$CH_2$—), ethylene (—$CH_2$—$CH_2$—), methylmethylene (—CH($CH_3$)—), 1-methyl-ethylene (—CH($CH_3$)—$CH_2$—), n-propylene (—$CH_2$—$CH_2$—$CH_2$—), 2-methylpropylene (—$CH_2$—CH($CH_3$)—$CH_2$—), 3-methylpropylene (—$CH_2$—$CH_2$—CH($CH_3$)—), n-butylene (—$CH_2$—$CH_2$—$CH_2$—$CH_2$—), 2-methylbutylene (—$CH_2$—CH($CH_3$)—$CH_2$—$CH_2$—), 4-methylbutylene (—$CH_2$—$CH_2$—$CH_2$—CH($CH_3$)—), pentylene and its chain isomers, hexylene and its chain isomers, heptylene and its chain isomers, octylene and its chain isomers, nonylene and its chain isomers, decylene and its chain isomers, undecylene and its chain isomers, dodecylene and its chain isomers. When a subscript is used herein following a carbon atom, the subscript refers to the number of carbon atoms that the named group may contain. For example, $C_1$-$C_{20}$ alkylene refers to an alkylene having between 1 and 20 carbon atoms.

Exemplary halogen atoms include chlorine, bromine, fluorine and iodine, wherein fluorine and chlorine are preferred.

The metallocene catalysts used herein are preferably provided on a solid support. The support can be an inert organic or inorganic solid, which is chemically unreactive with any of the components of the conventional metallocene catalyst. Suitable support materials for the supported catalyst include solid inorganic oxides, such as silica, alumina, magnesium oxide, titanium oxide, thorium oxide, as well as mixed oxides of silica and one or more Group 2 or 13 metal oxides, such as silica-magnesia and silica-alumina mixed oxides. Silica, alumina, and mixed oxides of silica and one or more Group 2 or 13 metal oxides are preferred support materials. Preferred examples of such mixed oxides are the silica-aluminas. Most preferred is a silica compound. In a preferred embodiment, the metallocene catalyst is provided on a solid support, preferably a silica support. The silica may be in granular, agglomerated, fumed or other form.

In an embodiment, the support of the metallocene catalyst is a porous support, and preferably a porous silica support having a surface area comprised between 200 and 900 m²/g. In another embodiment, the support of the polymerization catalyst is a porous support, and preferably a porous silica support having an average pore volume comprised between 0.5 and 4 ml/g. In yet another embodiment, the support of the polymerization catalyst is a porous support, preferably as described in US 2013/0211018 A1, hereby incorporated in its entirety by reference. In some embodiments, the support of the polymerization catalyst is a porous support, and preferably a porous silica support having an average pore diameter comprised between 50 and 300 Å, and preferably between 75 and 220 Å.

In some embodiments, the support has a D50 of at most 150 μm, preferably of at most 100 μm, preferably of at most 75 μm, preferably of at most 50 μm, preferably of at most 25 μm, preferably of at most 15 μm, preferably of at most 10 μm, preferably of at most 8 μm. The D50 is defined as the particle size for which fifty percent by weight of the particles has a size lower than the D50.

The measurement of the particle size can be made according to the International Standard ISO 13320:2009 ("Particle size analysis—Laser diffraction methods").

For example, the D50 can be measured by sieving, by BET surface measurement, or by laser diffraction analysis. For example, Malvern Instruments' laser diffraction systems may advantageously be used. The particle size may be measured by laser diffraction analysis on a Malvern type analyzer. The particle size may be measured by laser diffraction analysis on a Malvern type analyzer after having put the supported catalyst in suspension in cyclohexane. Suitable Malvern systems include the Malvern 2000, Malvern MasterSizer (such as Mastersizer S), Malvern 2600 and Malvern 3600 series. Such instruments together with their operating manual meet or even exceed the requirements set-out within the ISO 13320 Standard. The Malvern MasterSizer (such as Mastersizer S) may also be useful as it can more accurately measure the D50 towards the lower end of the range e.g. for average particle sizes of less 8 μm, by applying the theory of Mie, using appropriate optical means.

Preferably, the supported metallocene catalyst is activated. The cocatalyst, which activates the metallocene catalyst component, can be any cocatalyst known for this purpose such as an aluminium-containing cocatalyst, a boron-containing cocatalyst or a fluorinated catalyst. The aluminium-containing cocatalyst may comprise an alumoxane, an alkyl aluminium, a Lewis acid and/or a fluorinated catalytic support.

In an embodiment, alumoxane is used as an activating agent for the metallocene catalyst. The alumoxane can be used in conjunction with a catalyst in order to improve the activity of the catalyst during the polymerization reaction.

As used herein, the term "alumoxane" and "aluminoxane" are used interchangeably, and refer to a substance, which is capable of activating the metallocene catalyst. In an embodiment, alumoxanes comprise oligomeric linear and/or cyclic alkyl alumoxanes. In a further embodiment, the alumoxane has formula (IV) or (V)

$R^a$—(Al($R^a$)—O)$_x$—AlR$^a_2$ (IV) for oligomeric, linear alumoxanes; or (—Al($R^a$)—O—)$_y$ (V) for oligomeric, cyclic alumoxanes
wherein x is 1-40, and preferably 10-20;
wherein y is 3-40, and preferably 3-20; and
wherein each $R^a$ is independently selected from a $C_1$-$C_8$alkyl, and preferably is methyl. In a preferred embodiment, the alumoxane is methylalumoxane (MAO).

In a preferred embodiment, the metallocene catalyst is a supported metallocene-alumoxane catalyst comprising a metallocene and an alumoxane which are bound on a porous silica support. Preferably, the metallocene catalyst is a bridged bis-indenyl catalyst and/or a bridged bis-tetrahydrogenated indenyl catalyst.

One or more aluminiumalkyl represented by the formula AlR$^b_x$ can be used as additional co-catalyst, wherein each $R^b$ is the same or different and is selected from halogens or from alkoxy or alkyl groups having from 1 to 12 carbon atoms and x is from 1 to 3. Non-limiting examples are Tri-Ethyl Aluminum (TEAL), Tri-Iso-Butyl Aluminum (TIBAL), Tri-Methyl Aluminum (TMA), and Methyl-Methyl-Ethyl Aluminum (MMEAL). Especially suitable are trialkylaluminiums, the most preferred being triisobutylaluminium (TIBAL) and triethylaluminum (TEAL).

In some preferred embodiments, the metallocene catalyst used for the preparation of polyethylene B1 is the same as the metallocene catalyst used for the preparation of polyethylene B2. In some preferred embodiments, the metallocene catalyst used for the preparation of polyethylene A is the same as the metallocene catalyst used for the preparation of polyethylene B. In some preferred embodiments, the metallocene used is the same for polyethylene A, B1, and B2.

The polyethylene composition comprises at least 45% to at most 95% by weight of the metallocene-catalyzed polyethylene A, preferably said metallocene-catalyzed polyethylene A has a monomodal molecular weight distribution, wherein % by weight is based on the total weight of the polyethylene composition. Preferably said composition comprises at least 45% to at most 90% by weight, preferably at least 45% to at most 85% by weight of the metallocene-catalyzed polyethylene A, for example at least 48% to at most 83% by weight of the metallocene-catalyzed polyethylene A. In some embodiments, the composition comprises at least 50% to at most 95% by weight of polyethylene A, for example at least 55% to at most 95% by weight of polyethylene A, preferably at least 60% to at most 90% by weight of polyethylene A, for example at least 65% to at most 90% by weight of polyethylene A, for example at least 70% to at most 85% by weight of polyethylene A, for example at least 75% to at most 85% by weight of polyethylene A. Since component A has a (preferably significantly) higher MI2 than B1, the inventors have found that these percentages allow for an optimal balance of processability (avoid pressure die build up, melt fracture, etc) and mechanical properties, particularly for the present applications.

The metallocene-catalyzed polyethylene A has a density, as measured according to ISO 1183-2:2004 at a temperature of 23° C., of at least 0.916 g/cm3 to at most 0.940 g/cm3, preferably of at least 0.920 g/cm3 to at most 0.940 g/cm3, preferably of at least 0.925 g/cm3 to at most 0.940 g/cm3; preferably of at least 0.930 g/cm3 to at most 0.940 g/cm3. In some embodiments, polyethylene A has a density, as measured according to ISO 1183-2:2004 at a temperature of 23° C., of at least 0.916 g/cm3 to at most 0.939 g/cm3, preferably of at least 0.920 g/cm3 to at most 0.938 g/cm3, preferably of at least 0.924 g/cm3 to at most 0.937 g/cm3, preferably of at least 0.928 g/cm3 to at most 0.936 g/cm3, preferably of at least 0.932 g/cm3 to at most 0.935 g/cm3. The inventors have found that compositions with these densities have better thermal resistance and stability, as well as a better response to texturing.

The metallocene-catalyzed polyethylene A has a melt index MI2, as measured according to ISO 1133 Procedure B at a temperature of 190° C. and a load of 2.16 kg, of at least 1.5 g/10 min to at most 4.0 g/10 min, preferably of at least 2.0 g/10 min to at most 4.0 g/10 min, preferably of at least 2.5 g/10 min to at most 4.0 g/10 min. In some embodiments, polyethylene A has a melt index MI2 of at least 2.0 g/10 min to at most 3.8 g/10 min, for example at least 2.5 g/10 min to at most 3.6 g/10 min, for example at least 2.8 g/10 min to at most 3.4 g/10 min. The inventors have found that compositions with these melt indices show an optimal balance between processability and mechanical properties, particularly for the present applications.

In some preferred embodiments, the metallocene-catalyzed polyethylene A has a molecular weight distribution $M_w/M_n$ of at least 2.0 to at most 6.0, for example at most 5.0, for example at most 4.0, for example of at least 2.5 to at most 3.0, as measured using gel permeation chromatography, with $M_w$ being the weight-average molecular weight and $M_n$ being the number-average molecular weight.

In some preferred embodiments, polyethylene A is an ethylene copolymer with a $C_4$-$C_{12}$ alpha-olefin comonomer. Preferably the $C_4$-$C_{12}$ alpha-olefin is selected from the group comprising 1-butene, 1-hexene, 4-methyl-1-pentene, 3-methyl-1-butene, and 1-octene, most preferably the $C_4$-$C_{12}$ alpha-olefin is 1-hexene. In some preferred embodiments, polyethylene A has a 1-hexene comonomer content of at most 30% by weight, preferably of at most 20% by weight, preferably of at most 15% by weight, preferably of at most 10% by weight, preferably of at most 5% by weight, as measured according to NMR, based on the total weight of polyethylene A.

Polyethylene A can be prepared in a single polymerization reactor. The polymerization of ethylene for polyethylene A, can be carried out in gas, solution or slurry phase. In some preferred embodiments, the polymerization of ethylene for polyethylene A is carried out in slurry, preferably in a slurry loop reactor or a continuously stirred reactor. For example, the polyethylene can be prepared in slurry loop reactor system.

The polyethylene composition comprises 5% to 55% by weight of a metallocene-catalyzed polyethylene B, wherein % by weight is based on the total weight of the polyethylene composition, said polyethylene B preferably having a multimodal molecular weight distribution, more preferably a bimodal molecular weight distribution, and comprising:

b1) at least 45% to at most 75% by weight of a metallocene-catalyzed polyethylene B1, wherein % by weight is based on the total weight of the polyethylene B; and b2) at least 25% to at most 55% by weight of a metallocene-catalyzed polyethylene B2, wherein % by weight is based on the total weight of the polyethylene B.

In some embodiments, the composition comprises at least 5% to at most 50% by weight of polyethylene B, for example at least 5% to at most 45% by weight of polyethylene B, preferably at least 10% to at most 40% by weight of polyethylene B, for example at least 10% to at most 35% by weight of polyethylene B, for example at least 15% to at most 30% by weight of polyethylene B, for example at least 15% to at most 25% by weight of polyethylene B. The inventors have found that these percentages allow for an optimal balance of and mechanical properties, particularly for the present applications Polyethylene B1 can be obtained from the polyethylene B by fractionating polyethylene B in two fractions with preparative TREF. In some preferred embodiments, polyethylene B1 has a monomodal molecular weight distribution.

Polyethylene B1 has a density of at most 0.918 g/cm$^3$, as measured according to ISO 1183-2:2004 at a temperature of 23° C., and a melt index MI2 lower than the melt index MI2 of polyethylene A. In some preferred embodiments, B1 has a density of at least 0.904 g/cm$^3$, for example at least 0.906 g/cm$^3$, for example at least 0.908 g/cm$^3$, for example at least 0.910 g/cm$^3$, for example at least 0.912 g/cm$^3$. The inventors have found that lower densities might compromise the thermal resistance and stability of the yarn prepared from the composition. In addition, when the density was too low, texturation of the yarns was found to be particularly challenging, or simply not possible. In some preferred embodiments, the melt index MI2 of polyethylene B1 is at most 1.0 g/10 min, preferably at most 0.10 g/10 min, more preferably at most 0.05 g/10 min, as measured according to ISO 1133 Procedure B at a temperature of 190° C. and a load of 2.16 kg.

In some preferred embodiments, polyethylene B1 is an ethylene copolymer with a $C_4$-$C_{12}$ alpha-olefin comonomer, preferably wherein the $C_4$-$C_{12}$ alpha-olefin is selected from the group comprising 1-butene, 1-hexene, 4-methyl-1-pentene, 3-methyl-1-butene, and 1-octene, most preferably wherein the $C_4$-$C_{12}$ alpha-olefin is 1-hexene. In some preferred embodiments, polyethylene B1 has a comonomer content of at most 30% by weight, preferably of at most 20% by weight, more preferably of at most 15% by weight, as measured according to NMR, based on the total weight of polyethylene B1. In some preferred embodiments, polyethylene B1 has a 1-hexene comonomer content of at most 30% by weight, preferably of at most 20% by weight, more preferably of at most 15% by weight, as measured according to NMR, based on the total weight of polyethylene B1. In some preferred embodiments, polyethylene B1 has a monomodal molecular weight distribution.

In some preferred embodiments, polyethylene B1 has a density of at most 0.918 g/cm$^3$, for example of at most 0.917 g/cm$^3$, for example of at most 0.916 g/cm$^3$, for example of at most 0.915 g/cm$^3$, for example of at most 0.914 g/cm$^3$, as measured according to ISO 1183-2:2004 at a temperature of 23° C. In some preferred embodiments, the $M_w$ of polyethylene B1 is at least 80 kDa to at most 180 kDa.

In some preferred embodiments, the CDC of polyethylene B1 is at least 150, preferably at least 170, more preferably at least 190, as analyzed by TREF (cooling rate of 1° C./hour). In some preferred embodiments, the soluble fraction of polyethylene fraction B1 is at most 1.00%, preferably at most 0.75%, more preferably at most 0.50%, as analyzed by TREF (cooling rate of 1° C./hour).

Polyethylene B2 can be obtained from the polyethylene B by fractionating the polyethylene B in two fractions with preparative TREF. In some preferred embodiments, polyethylene B2 has a monomodal molecular weight distribution.

Polyethylene B2 has a density higher than the density of polyethylene B1; and a melt index MI2 higher than the melt index MI2 of polyethylene B1. In some embodiments, polyethylene B2 is an ethylene homopolymer.

In some preferred embodiments, the ratio of the $M_w$ of B1/$M_w$ of polyethylene B2 is at least 2.5 to at most 6.0, as measured using gel permeation chromatography, with $M_w$ being the weight-average molecular weight. For example, the ratio $M_w$ of polyethylene B1/$M_w$ polyethylene B2 can at least 2.6 to at most 6.0, for example the ratio $M_w$ of polyethylene B1/$M_w$ of polyethylene B2 can be at least 2.6 to at most 5.5, for example at least 2.7 to at most 5.3.

In some preferred embodiments, the CDC of polyethylene B2 is at least 150, preferably at least 170, more preferably at least 190, as analyzed by TREF (cooling rate of 1° C./hour). In some preferred embodiments, the soluble fraction of polyethylene B2 is at most 1.00%, preferably at most 0.75%, more preferably at most 0.50%, as analyzed by TREF (cooling rate of 1° C./hour).

The polyethylene composition comprises 5% to 55% by weight of a metallocene-catalyzed polyethylene B, wherein % by weight is based on the total weight of the polyethylene composition, preferably wherein said metallocene-catalyzed polyethylene B has a bimodal molecular weight distribution.

In some preferred embodiments, polyethylene B is an ethylene copolymer with a $C_4$-$C_{12}$ alpha-olefin comonomer, preferably wherein the $C_4$-$C_{12}$ alpha-olefin is selected from the group comprising 1-butene, 1-hexene, 4-methyl-1-pentene, 3-methyl-1-butene, and 1-octene, most preferably wherein the $C_4$-$C_{12}$ alpha-olefin is 1-hexene. In some preferred embodiments, polyethylene B has a 1-hexene comonomer content of at most 30% by weight, preferably of at most 20% by weight, preferably of at most 15% by weight, more preferably of at most 10% by weight, as measured according to NMR, based on the total weight of polyethylene B.

In some preferred embodiments, the polyethylene composition comprises at least 5% to at most 55% by weight of polyethylene B, preferably at least 8% to at most 55% by weight, preferably at least 10% to at most 55% by weight, preferably at least 12% to at most 54% by weight, preferably at least 15% to at most 53% by weight, preferably at least 18% to at most 52% by weight, wherein % by weight is based on the total weight of the polyethylene composition.

In some preferred embodiments, polyethylene B comprises at least 45% to at most 75% by weight of polyethylene B1, preferably at least 50% to at most 70% by weight of polyethylene B1, preferably at least 55% to at most 65% by weight of polyethylene B1, preferably at least 55% to at most 62% by weight of polyethylene B1, wherein % by weight is based on the total weight of polyethylene B.

In some preferred embodiments, polyethylene B comprises at least 25% to at most 55% by weight of polyethylene B2, preferably at least 30% to at most 50% by weight of polyethylene B2, preferably at least 35% to at most 45% by weight of polyethylene B2, preferably at least 39% to at most 45% by weight of polyethylene B2, wherein % by weight is based on the total weight of polyethylene B.

In some preferred embodiments, the rheology long chain branching index $g_{rheo}$ of polyethylene B is at most 0.9, for example of at most 0.85, for example of at most 0.80, for example of at most 0.75. Preferably, polyethylene B has a $g_{rheo}$ of at least 0.35. The rheology long chain branching index $g_{rheo}$ can be measured as described in the example section.

In some preferred embodiments, the CDC of polyethylene B is at least 50, preferably at least 60, preferably at least 70, preferably at most 150, preferably at most 130, as analyzed by TREF (cooling rate of 1° C./hour). In some preferred embodiments, the soluble fraction of polyethylene B is at most 1.00%, preferably at most 0.75%, more preferably at most 0.50%, as analyzed by TREF (cooling rate of 1° C./hour).

In some preferred embodiments, the Vicat softening temperature $T_v$ of polyethylene B expressed in ° C., as measured according to ISO 306:2013 method A120, satisfies the relationship $T_v > 825 \times d - 654$, wherein d is the density expressed in g/cm³.

In some preferred embodiments, polyethylene B has a melt index MI2, as measured according to ISO 1133 Procedure B at a temperature of 190° C. and a load of 2.16 kg, of at least 0.10 g/10 min to at most 5.00 g/10 min, preferably of at least 0.20 g/10 min to at most 4.00 g/10 min, more preferably of at least 0.30 g/10 min to at most 3.00 g/10 min.

In some preferred embodiments, polyethylene B has a polydispersity index (PDI) of at least 6.5, for example of at least 6.7, for example of at least 6.9, for example of at least 7.0.

In some preferred embodiments, the metallocene-catalyzed polyethylene B has a molecular weight distribution $M_w/M_n$ of at least 2.0 to at most 6.0, for example at most 5.0, for example at most 4.0, for example of at least 2.5 to at most 4.0, as measured using gel permeation chromatography, with $M_w$ being the weight-average molecular weight and $M_n$ being the number-average molecular weight.

In some embodiments, polyethylene B can be prepared by chemically blending polyethylene fractions B1 and B2. For example, polyethylene B can be prepared in at least two sequential polymerization reactors, operating under different conditions, wherein a first polyethylene fraction is prepared in a first reactor, and a second polyethylene fraction is prepared in a second reactor in the presence of the first polyethylene fraction. For example, the hydrogen concentration and/or comonomer content can be controlled in each reactor separately, such as to produce polyethylene B.

The polymerization of ethylene for polyethylene B1, B2, and/or B can be carried out in gas, solution or slurry phase. In some preferred embodiments, the polymerization of ethylene for polyethylene B1, B2, and/or B is carried out in slurry, preferably in a slurry loop reactor or a continuously stirred reactor. For example, the polyethylene can be prepared in slurry loop reactor system.

In some preferred embodiments, metallocene-catalyzed polyethylene B is prepared in a process comprising the steps of:
(a) feeding ethylene monomer, a diluent, at least one metallocene catalyst, optionally hydrogen, and optionally one or more olefin comonomers into at least one first slurry loop reactor; polymerizing the ethylene monomer, and the optionally one or more olefin comonomers, in the presence of the metallocene catalyst, and optional hydrogen, in said first slurry loop reactor to produce a first polyethylene fraction;
(b) feeding the first polyethylene fraction to a second slurry loop reactor serially connected to the first slurry loop reactor, and in the second slurry loop reactor polymerizing ethylene, and optionally one or more olefin comonomers, in the presence of the first polyethylene fraction, and optionally hydrogen, thereby producing the polyethylene resin B.

In some embodiments, polyethylene fraction B1 is prepared in the first reactor of at least two sequential polymerization reactors. In some embodiments, polyethylene fraction B2 is prepared in the first reactor of at least two sequential polymerization reactors. In some embodiments, polyethylene fraction B1 is prepared in the second reactor of at least two sequential polymerization reactors. In some preferred embodiments, polyethylene fraction B2 is prepared in the second reactor of at least two sequential polymerization reactors. In some embodiments, polyethylene fraction B1 is prepared in the first reactor and polyethylene fraction B2 is prepared in the second reactor of at least two sequential polymerization reactors. In some preferred embodiments, polyethylene fraction B2 is prepared in the first reactor and polyethylene fraction B1 is prepared in the second reactor of at least two sequential polymerization reactors.

The two reactors can be operated under the comonomer/hydrogen split mode of "inverse" (also described herein as "reverse") configuration, wherein a first low molecular weight (high melt index), high density polyethylene fraction B2 is prepared in the first reactor and a second high molecular weight (low melt index), low density polyethylene fraction B1 is prepared in the second reactor. In this case, the first polyethylene fraction does not need to be degassed before being transferred to the second reactor. Polyethylene fraction B2 is preferably substantially free of comonomer, particularly for densities of fraction B2 of at least 0.960 g/cm³.

This is as opposed to the "direct" configuration, wherein the first high molecular weight, low density polyethylene fraction B1 is prepared in the first reactor and the second low molecular weight, high density polyethylene fraction B2 is prepared in the second reactor, in which case the first polyethylene fraction B1 is preferably degassed in order to substantially remove all unpolymerized comonomer and thus for said second fraction B2 to be substantially free of comonomer, particularly for densities of fraction B2 of at least 0.960 g/cm³.

As used herein, the terms "loop reactor" and "slurry loop reactor" may be used interchangeably herein. In certain embodiments, each loop reactor may comprise interconnected pipes, defining a reactor path. In certain embodiments, each loop reactor may comprise at least two vertical pipes, at least one upper segment of reactor piping, at least one lower segment of reactor piping, joined end to end by junctions to form a complete loop, one or more feed lines, one or more outlets, one or more cooling jackets per pipe, and one pump, thus defining a continuous flow path for a polymer slurry. The vertical sections of the pipe segments are preferably provided with cooling jackets. Polymerization heat can be extracted by means of cooling water circulating in these jackets of the reactor. The loop reactor preferably operates in a liquid full mode.

In certain embodiments, the process may be preceded by a pre-polymerization step. In certain embodiments, the pre-polymerization may be performed in a pre-polymerization (or further or third) slurry loop reactor connected in series with the first loop reactor. In certain embodiments, the pre-polymerization step may comprise pre-polymerizing ethylene in the presence of the metallocene catalyst in said pre-polymerization loop reactor connected in series with the first loop reactor.

When polyethylene B1 is prepared in the second reactor of at least two reactors connected in series, the density of polyethylene B1 is linked to that of the density of polyethylene B2 as measured on the fluff by the following expression:

$$d = 0.9995 * W_{B2} * d_{B2} + 1.0046(1 - W_{B1}) * d_{B1}$$

wherein d is the density of the final polyethylene fluff, $W_{B2}$ is the weight fraction of polyethylene B2, $d_{B2}$ is the density of polyethylene B2 as measured on the fluff, $d_{B1}$ is the density of polyethylene B1, and wherein the sum of both polyethylene B2 and B1 by weight ($W_{B2} + W_{B1}$) is 1.

In some embodiments, when polyethylene B1 is prepared in the second reactor of at least two reactors connected in series, the MI2 of polyethylene B1 is calculated based on the measured melt indexes and polyethylene contents of B2 and final resin B.

The MI2 of polyethylene B1 is calculated using the following expression, preferably when prepared in the presence of a THI metallocene catalyst:

MI2 of the blend (final resin):

$$MI2 = 0.894 * W_{B1} * Ln(MI2_{B1}) - 5.61 * (W_{B1})^2 + 0.9304 * Ln(MI2_{B2}) - 0.0877 * (W_{B2} * Ln(MI2_{B1}))^2$$

wherein MI2 is the MI2 of the polyethylene B, $W_{B2}$ is the weight fraction of polyethylene B2, $MI2_{B2}$ is the MI2 of polyethylene B2 measured on the fluff exiting the first reactor, $MI2_{B1}$ is the MI2 of polyethylene B1 as calculated, and wherein the sum of both polyethylene B2 and B1 by weight ($W_{B2} + W_{B1}$) is 1.

The polymerization can be performed over a wide temperature range. In certain embodiments, the polymerization may be performed at a temperature from 20° C. to 125° C., preferably from 60° C. to 110° C., more preferably from 75° C. to 105° C. and most preferably from 80° C. to 100° C. In certain embodiments, the polymerization step may be performed at a pressure from about 20 bar to about 100 bar, preferably from about 30 bar to about 50 bar, and more preferably from about 37 bar to about 45 bar.

Gas phase processes for the polymerization of olefins are well known in the art. Typical operating conditions for the gas phase are from 20° C. to 100° C. and most preferably from 40° C. to 85° C. with pressures up to 100 bar. Preferred gas phase processes are those operating in a fluidized bed.

The catalyst is preferably added to the slurry reactor as catalyst slurry. As used herein, the term "catalyst slurry" refers to a composition comprising catalyst solid particles and a diluent. The solid particles can be suspended in the diluent, either spontaneously or by homogenization techniques, such as mixing. The solid particles can be non-homogeneously distributed in a diluent and form sediment or deposit.

As used herein, the term "diluent" refers to any organic diluent, which does not dissolve the synthesized polyolefin. As used herein, the term "diluent" refers to diluents in a liquid state, liquid at room temperature and preferably liquid under the pressure conditions in the loop reactor. Suitable diluents comprise but are not limited to hydrocarbon diluents such as aliphatic, cycloaliphatic and aromatic hydrocarbon solvents, or halogenated versions of such solvents. Preferred solvents are C12 or lower, straight chain or branched chain, saturated hydrocarbons, C5 to C9 saturated alicyclic or aromatic hydrocarbons or C2 to C6 halogenated hydrocarbons. Non-limiting illustrative examples of solvents are butane, isobutane, pentane, hexane, heptane, cyclopentane, cyclohexane, cycloheptane, methyl cyclopentane, methyl cyclohexane, isooctane, benzene, toluene, xylene, chloroform, chlorobenzenes, tetrachloroethylene, dichloroethane and trichloroethane, preferably isobutane.

In some embodiments, the polyethylene composition comprises a polyethylene-based composition C. Preferably, polyethylene-based composition C is a polyethylene-based masterbatch. In some preferred embodiments, the polyethylene composition comprises at least 0.01% to at most 10% by weight of a polyethylene-based composition C, wherein polyethylene-based composition C comprises one or more additives selected from the group comprising: antioxidants, UV stabilizers, pigments, processing aids, acid scavengers, lubricants, antistatic agents, fillers, nucleating agents, or clarifying agents, based on the total weight of the polyethylene composition.

In some embodiments, the polyethylene composition comprises one or more additives. Preferably, polyethylene-based composition C comprises one or more additives. The additives are such as for example antioxidants, UV stabilizers, pigments, processing aids, acid scavengers, lubricants, antistatic agents, fillers, nucleating agents, or clarifying agents. An overview of useful additives is given in Plastics Additives Handbook, ed. H. Zweifel, 5$^{th}$ edition, Hanser Publishers. These additives may be present in quantities generally between 0.01 and 10 weight % based on the weight of the polyethylene composition.

Preferably, the polyethylene composition comprises a processing aid, for example a fluoroelastomer. In some preferred embodiments, the polyethylene composition comprises at least 0.2% to at most 2.0% by weight of a processing aid, for example a fluoroelastomer, preferably at least 0.5% to at most 1.5% by weight, based on the weight of the polyethylene composition. The properties of final polyethylene composition may be obtained from the final resin (which includes optional polyethylene-based composition C and optional additives), or from the resin prior to addition of any masterbatches (such as polyethylene-based composition C) and/or any additives. In case of the latter, whereby polyethylene-based composition C and/or additives are not taken into account, the properties of the polyethylene composition are defined as the properties of the blend of polyethylene A, B1, and B2; or as the properties of the blend of polyethylene A and B.

In some preferred embodiments, the melt index MI2 of the polyethylene composition, as measured according to ISO 1133 Procedure B at a temperature of 190° C. and a load of 2.16 kg, is at least 1.0 g/10 min to at most 4.5 g/10 min. In some preferred embodiments, the melt index MI2 of the blend of polyethylene A and B is at least 1.0 g/10 min to at most 4.5 g/10 min. In some preferred embodiments, the density of the polyethylene composition is at least 0.916 g/cm$^3$ to at most 0.940 g/cm$^3$, as measured according to ISO 1183-2:2004 at a temperature of 23° C. In some preferred embodiments, the density of the blend of polyethylene A and B is at least 0.916 g/cm$^3$ to at most 0.940 g/cm$^3$, as measured according to ISO 1183-2:2004 at a temperature of 23° C.

The present invention also encompasses a process for preparing a polyethylene composition according to the first aspect of the invention. Preferred embodiments for the polyethylene composition of the invention are also preferred embodiments for the processes for preparing of the polyethylene composition of the invention.

In some embodiments, the process comprises the steps of:
i) providing a metallocene-catalyzed polyethylene A;
ii) providing a metallocene-catalyzed polyethylene B;
iii) blending polyethylene A and B into a polyethylene composition as described herein.

In some preferred embodiments, said blending is performed through physically blending the polyethylene, for example through melt blending the polyethylene.

Polyethylene A can be prepared in a single polymerization reactor. Polyethylene B1 can be prepared in a single polymerization reactor. Polyethylene B2 can be separately prepared in a single polymerization reactor, and then all three polyethylenes can be blended together.

The polyethylene composition can be obtained by chemically or physically blending at least two polyethylenes A and B, or by chemically or physically blending at least three polyethylenes A, B1, and B2. The polyethylene composition can be obtained by a mixture of chemically or physically blending at least three polyethylenes A, B1, and B2. Polyethylene B can be obtained by chemically or physically blending at least two polyethylene fractions B1 and B2.

In some embodiments, the blending of polyethylenes A and B may be performed by physically blending, preferably by melt blending. In some preferred embodiments, the two polyethylenes A and B are blended in fluff form, powder form, or pellet form, preferably in pellet form.

As used herein, the term "melt blending" involves the use of shear force, extensional force, compressive force, ultrasonic energy, electromagnetic energy, thermal energy or combinations comprising at least one of the foregoing forces or forms of energy and is conducted in processing equipment wherein the aforementioned forces are exerted by a single screw, multiple screws, intermeshing co-rotating or counter rotating screws, non-intermeshing co-rotating or counter rotating screws, reciprocating screws, screws with pins, barrels with pins, rolls, rams, helical rotors, or combinations comprising at least one of the foregoing. Melt blending may be conducted in machines such as, single or multiple screw extruders, Buss kneader, Eirich mixers, Henschel, helicones, Ross mixer, Banbury, roll mills, molding machines such as injection molding machines, vacuum forming machines, blow molding machines, or the like, or combinations comprising at least one of the foregoing machines. In a preferred embodiment, melt blending is performed in a twin screw extruder, such as a Brabender co-rotating twin screw extruder.

The invention also encompasses an article comprising the polyethylene composition as described above. Preferred embodiments for polyethylene composition of the invention are also preferred embodiments for the article of the invention. The invention also encompasses a process for preparing an article according to the invention. Preferred embodiments as described above are also preferred embodiments for the present process. Preferably, the article is a fiber. The term fiber refers to all kinds of fibers, and specifically slit films, tapes and filaments of any shape and size. The dimensions thereof depend on the end application area, as well known in the art. Filaments are preferably monofilaments.

The invention also comprises the use of the polyethylene composition to prepare a fiber. Preferably, the fiber is selected from the group comprising monofilament, slit film, or tape. The slit films, monofilaments, and/or tapes may be particularly suitable for tufting into artificial grass or also known as artificial turf, including synthetic sporting surfaces. The slit film, monofilament, tape or similar of the present invention may typically be in stretched form.

According to a third aspect, the present invention provides a fiber comprising the polyethylene composition according to the first aspect of the invention. Preferred embodiments for the polyethylene composition of the invention are also preferred embodiments for the processes for fiber comprising the polyethylene composition of the invention. Preferably, the fiber is selected from the group comprising monofilament, slit film, or tape.

In some preferred embodiments, the fiber has a draw ratio of at least 1:3 to at most 1:8, preferably of at least 1:3 to at most 1:6, more preferably of at least 1:4 to at most 1:5.

According to a fourth aspect, the present invention provides a process for preparing a fiber wherein the fiber is according to the third aspect of the invention. Preferred embodiments for the fiber of the invention are also preferred embodiments for the processes for preparing the fiber of the invention.

The polyethylene composition as defined above, typically in the form of pellets, can be converted to fibers of the invention. The fibers are preferably selected from the group comprising: monofilaments, slit films, or tapes.

The fibers can preferably be prepared via a film extrusion process, such as cast film or blown film process, via film slitting to produce for example tapes, or via a direct extrusion process to produce filaments, preferably monofilaments. When fibers of the invention comprise a mixture of the polyethylene composition together with other polymer components, the different polymer components are typically intimately mixed prior to extrusion.

According to one commonly used alternative, said polyethylene composition can be extruded into fibers, tapes or filaments, preferably monofilaments, using know filament extrusion process. One useful process for producing the fibers of invention is described in "Fiber Technology" Hans A. Krassig, Jurgen Lenz, Herman F. Mark; ISBN: 0-8247-7097-8.

In a second also commonly used alternative, said polyethylene composition may be extruded into a film which is subsequently cut into fibers. Both preparation methods are conventional and generally known in the production of fibers.

As to the fiber preparation process wherein a film is first formed and then cut into fibers or tapes, the following preparation method may be used. The film may be prepared by any conventional film formation process including extrusion procedures, such as cast film or blown film extrusion, lamination processes or any combination thereof. The film may be a monolayer or multilayer film, e.g. a coextruded multilayer film. In the case of a multilayer film, preferably, the film layers may comprise the same or different polymer composition, whereby at least one layer comprises the polyethylene composition of the invention. Preferably, all layers of a multilayer film comprise, more preferably consist of, a polyethylene composition of the invention. In some embodiments all layers of a multilayer film comprise, more preferably consist of, the same polyethylene composition of the invention.

In some embodiments, the film is formed by blown film extrusion and in case of multilayered film structure by blown film co-extrusion processes. Typically the polyethylene composition may be blown (co)extruded at a temperature in the range 160° C. to 240° C., and cooled by blowing gas (generally air) at a temperature of 10° C. to 50° C. to provide a frost line height of 1 or 2 to 8 times the diameter of the die. The blow up ratio is preferably at most 6, e.g. at most 4, more preferably at least 1.0 to at most 1.5, and even more preferably at least 1.0 to at most 1.2. For example, the film may be (co)extruded to form a bubble which is then collapsed and cooled, if necessary, and the obtained tubular film is cut to fibers. Alternatively, the (co)extruded bubble may be collapsed and split into two film laminates. The formed film is then cut to fibers. Alternatively, fibers can be cut from a cast film that is prepared by procedures well known in the field.

In some embodiments, the fibers are in stretched, i.e. oriented, form. Preferably fibers are stretched uniaxially, more preferably in the machine direction (MD). Accordingly, in the first direct filament formation alternative, said fibers can be stretched to a desired draw ratio after extrusion to filaments. In the second fiber preparation alternative, wherein a film is first formed and cut to fibers, said film can be stretched before cutting to stretched fibers, e.g. tapes, or the film is first cut e.g. to tapes and then the formed tapes are stretched to form final fibers. Preferably the film is first cut e.g. to tapes which are then stretched to a desired draw ratio to form final fibers. As to preparation of fibers by first forming a film and cutting it into fibers and tapes, reference can be made to the known Lenzing process (for stretching a film prior to cutting into tapes) and the Iso process (for cutting a film into tapes and stretching the formed tapes).

As a preferred embodiment thus stretched fibers are provided which are preferably in stretched, i.e. oriented, form, preferably in uniaxially oriented form.

Heat may typically be applied during the stretching, e.g. during in line stretching. The stretching ratio can be determined e.g. by the speed ratio of the godet rolls before and after the heating means in a manner known in the art. As also well known, the stretch and heat setting ratios can be optimized and adapted depending on the demands of the end application. As heating means e.g. an oven or a hot water bath can be used at temperatures typically between 90° C. and 130° C. or 90-99° C., respectively. Accordingly, the fiber preparation process preferably comprises a step of stretching extruded filaments, of stretching fibers/tapes cut from a film, or of stretching film prior to cutting into fibers/tapes, whereby the stretching is preferably effected in the machine direction (MD) in a draw ratio of at least 1:3. A preferable fiber preparation process thus comprises a step of extruding the polyethylene composition into a fiber which is optionally stretched, preferably in MD, at least 3 times its original length, or a film which is optionally stretched, preferably in MD, at least 3 times its original length and subsequently cut to fibers, or which film is first cut to fibers that are optionally stretched, preferably in MD, at least 3 times their original length.

More preferably, extruded fibers, fibers/tapes cut from a film or a film prior to cutting into fibers/tapes is/are stretched 3 to 10 times its/their original length in the MD. The expressions "stretching 3 times its/their original length" and "drawn down to 3 times its/their original length" mean the same and can also be expressed as a "stretch ratio of at least 1:3" and, respectively, "draw ratio of at least 1:3", wherein "1" represents the original length of the film and "3" denotes that it has been stretched/drawn down to 3 times that original length.

In a preferred embodiment, the fiber of the invention does not have a hollow core, i.e. it is solid across its cross section. It is preferred therefore if the fiber of the invention is not hollow.

For example, when fiber is prepared to a tape form, then such tape may typically have a width of at least 0.5 mm, preferably of at least 1 mm. The upper limit of a tape width is not critical and can be e.g. up to 15 mm, preferably up to 10 mm. The thickness of a tape may be e.g. at least 25 µm, preferably at least 50 µm. Again, the upper limit of a tape thickness is not limited and can be e.g. up to 500 µm, preferably up to 300 µm, in some end applications preferably up to 100 µm. In case of fibers and filaments the dimensions thereof typically correspond to the size range, i.e. dimensions, given above for a tape form. The width ranges and other dimensions given above apply both to fibers in stretched form and fibers in non-stretched form. Preferably, fibers are in stretched form and may have the width and other dimensions as defined above.

In some embodiments, the dtex of the fiber in the form of a monofilament is at least 400 dtex to at most 4000 dtex, preferably at least 500 dtex to at most 3500 dtex, preferably at least 1000 dtex to at most 3000 dtex, preferably at least 1500 dtex to at most 2500 dtex. In some other embodiments, the dtex of the fiber in the form of a tape is at least 4000 dtex to at most 15000 dtex, preferably at least 5000 dtex to at most 12000 dtex, preferably at least 7000 dtex to at most 10000 dtex. The dtex is a measure of weight per length of filament (g/10000), and can be measured by standard weighing and measuring tools known in the art.

The invention also encompasses the use of the fiber according to the third aspect of the invention, preferably wherein the fiber is selected from the group comprising: monofilament, slit film, or tape, to prepare an artificial turf face yarn, also referred to herein as "turf yarn". The invention also comprises the use of the fiber according to the third aspect of the invention, preferably wherein the fiber is selected from the group comprising: monofilament, slit film, or tape, to prepare artificial turf.

In some embodiments, the fiber may be used as turf yarn. The turf yarn may be made using any appropriate process for the production of artificial turf yarn from polymer compositions. The following describes one such process. Turf yarns may be made by extrusion. Typical turf yarn extruders are equipped with a single PE/PP general purpose screw and a melt pump ("gear pump" or "melt pump") to precisely control the consistency of polymer volume flow into the die. Turf yarn dies have multiple single holes for the individual filaments distributed over a circular or rectangular spin plate. The shape of the holes corresponds to the desired yarn cross-section profile, including for example, rectangular, dog-bone, and v-shaped. A standard spin plate has 50 to 160 die holes of specific dimensions. Lines typically have output rates from 150 kg/h to 350 kg/h.

The turf yarns are typically extruded into a water-bath with typical die-water-bath distance of from 16 mm to 50 mm. Coated guiding bars in the water redirect the yarn filaments towards the first take off set of rollers. The linear speed of this set of rollers typically varies from 15 m/min to 70 m/min. The takeoff set of rollers can be heated and used to preheat the yarn after the water bath before entering the oven. A yarn can be passed over this first set of rollers, and then drawn through a heated air or water bath oven. The first oven can be either a hot air oven with co- or countercurrent hot air flow which can be operated from 50° C. to 150° C. or a hot water-oven wherein the yarn is oriented at temperatures from 50° C. to 98° C. At the exit of the oven, the yarn can be passed onto a second set of rollers that can be run at a different (higher or lower) speed than the first set of rollers. The linear velocity ratio of the rollers after the oven to the rollers in front of the oven is referred to as either a stretching or relaxation ratio. In a three oven process, there are a at least four sets of rollers; a first set of rollers before the first oven, a second set of rollers between the first and second oven, a third set of roller between the second and third ovens, and a fourth set of rollers following the third oven.

The present invention also encompasses an artificial turf comprising the polyethylene composition according to the first aspect of the invention, for example an artificial turf comprising fibers according to the third aspect of the invention. Preferred embodiments for the polyethylene composition or for the fibers of the invention are also preferred embodiments for the artificial turf comprising the polyethylene composition of the invention or the fibers of the invention. Preferably wherein fibers are selected from the group comprising: monofilament, slit film, or tape The following examples serve to merely illustrate the invention and should not be construed as limiting its scope in any way. While the invention has been shown in only some of its forms, it should be apparent to those skilled in the art that it is not so limited, but is susceptible to various changes and modifications without departing from the scope of the invention.

EXAMPLES

Test Methods:

The density was measured as measured according to ISO 1183-2:2004 Part 2: Density gradient column method at a temperature of 23° C.

The melt index MI2 of the polyethylene was measured according to ISO 1133 Procedure B, condition Data temperature of 190° C. and a load of 2.16 kg.

The melt index MI5 of the polyethylene was measured according to ISO 1133 Procedure B, condition T at a temperature of 190° C. and a load of 5 kg.

The melt temperature of the polyethylene was measured according to ISO 11357.

The Vicat softening Temperature $T_v$ was measured according to ISO 306:2013 method A120.

The molecular weights ($M_n$ (number average molecular weight), $M_w$ (weight average molecular weight) and molecular weight distributions d ($M_w/M_n$), and d' ($M_z/M_w$) were determined by size exclusion chromatography (SEC) and in particular by gel permeation chromatography (GPC). Briefly, a GPC-IR5 from Polymer Char was used: 10 mg polyethylene sample were dissolved at 160° C. in 10 mL of trichlorobenzene for 1 hour. Injection volume: about 400 μL, automatic sample preparation and injection temperature: 160° C. Column temperature: 145° C. Detector temperature: 160° C. Two Shodex AT-806MS (Showa Denko) and one Styragel HT6E (Waters) columns were used with a flow rate of 1 ml/min. Detector: Infrared detector (2800-3000 cm$^{-1}$). Calibration: narrow standards of polystyrene (PS) (commercially available). Calculation of molecular weight $M_i$ of each fraction i of eluted polyethylene is based on the Mark-Houwink relation ($\log_{10}(M_{PE})=0.965909 \times \log_{10}(M_{PS})-0.28264$) (cut off on the low molecular weight end at $M_{PE}=1000$).

The molecular weight averages used in establishing molecular weight/property relationships are the number average ($M_n$), weight average ($M_w$) and z average ($M_z$) molecular weight. These averages are defined by the following expressions and are determined form the calculated $M_i$:

$$M_n = \frac{\sum_i N_i M_i}{\sum_i N_i} = \frac{\sum_i W_i}{\sum_i W_i/M_i} = \frac{\sum_i h_i}{\sum_i h_i/M_i}$$

$$M_w = \frac{\sum_i N_i M_i^2}{\sum_i N_i M_i} = \frac{\sum_i W_i M_i}{\sum_i W_i} = \frac{\sum_i h_i M_i}{\sum_i h_i}$$

$$M_z = \frac{\sum_i N_i M_i^3}{\sum_i N_i M_i^2} = \frac{\sum_i W_i M_i^2}{\sum_i W_i M_i} = \frac{\sum_i h_i M_i^2}{\sum_i h_i M_i}$$

Here, $N_i$ and $W_i$ are the number and weight, respectively, of molecules having molecular weight Mi. The third representation in each case (farthest right) defines how one obtains these averages from SEC chromatograms. Here, $h_i$ is the height (from baseline) of the SEC curve at the i$^{th}$ elution fraction and $M_i$ is the molecular weight of species eluting at this increment.

Rheology long chain branching index $g_{rheo}$ was measured according to the formula, as described in WO 2008/113680:

$$g_{rheo}(PE) = \frac{M_w(SEC)}{M_w(\eta_0, MWD, SCB)}$$

wherein $M_w$ (SEC) is the weight average molecular weight obtained from size exclusion chromatography expressed in kDa;

and wherein $M_w$ ($\eta_0$, MWD, SCB) is determined according to the following, also expressed in kDa:

$M_w(\eta_0, MWD, SCB) = \exp(1.7789 + 0.199769$ Ln $M_n + 0.209026$(Ln $\eta_0) + 0.955$(ln ρ)$- 0.007561$(Ln $M_z$)(Ln $\eta_0) + 0.02355$(ln $M_z)^2$)

Number- and z-average molecular weights, Mn and Mz expressed in kDa, are obtained from size exclusion chromatography; Density p is measured in g/cm$^3$ and measured according to ISO 1183 at a temperature of 23° C.;

wherein the zero shear viscosity $\eta_0$ in Pa·s is obtained from a frequency sweep experiment combined with a creep experiment, in order to extend the frequency range to values down to 10$^{-4}$ s$^{-1}$ or lower, and taking the usual assumption of equivalence of angular frequency (rad/s) and shear rate; wherein zero shear viscosity $\eta_0$ is estimated by fitting with Carreau-Yasuda flow curve (η–W) at a temperature of 190° C., obtained by oscillatory shear rheology on ARES-G2 equipment (manufactured by TA Instruments) in the linear viscoelasticity domain; wherein circular frequency (W in rad/s) varies from 0.05-0.1 rad/s to 250-500 rad/s, typically 0.1 rad/s to 250 rad/s, and the shear strain is typically 10%. In practice, the creep experiment is carried out at a temperature of 190° C. under a nitrogen atmosphere with a stress level such that after 1200 s the total strain is less than 20%; wherein the apparatus used is an AR-G2 manufactured by TA instruments.

The intrinsic viscosity inferred from rheology can thus be expressed using the Carreau-Yasuda equation: $\eta = \eta_0/(1+(W*_T)^b)^{((1-n)/b)}$ wherein parameters T, b and n are fitting parameters called respectively 'relaxation time', 'breadth parameter' and 'power-law parameter', which are obtained using non-linear regression with standard software such as SigmaPlot® version 10 or the Excel® Solver function. From this $\eta_0$ in Pa·s can thus be obtained and used in the equation for Mw ($\eta_0$, MWD, SCB) provided above.

The polydispersity Index (PDI) can be determined at a temperature of 190° C. by using parallel plates rheometer model ARES-G2 marketed by TA instrument (USA), operating at an oscillation frequency which increases from 0.1 rad/sec to about 300 rad/sec. From the crossover modulus one can derive the PI by way of the equation: $PI=10^6/Gc$ in which Gc is the crossover modulus which is defined as the value (expressed in Pa) at which $G'=G''$ wherein G is the storage modulus and G" is the loss modulus.

The CDBI (Composition Distribution Breadth Index) is a measure of the breadth of the distribution of copolymer composition, with regard to the level of comonomer incorporated into the polymer, the latter reducing crystallinity of domains made from such polymer chains by means of short side chain branching as compared to crystalline homopolymer. This is described, for example, in WO 93/03093. The CDBI is defined as the percent by weight or mass fraction of the copolymer molecules having a comonomer content of ±25% of the median total molar comonomer content, i.e. the share of comonomer molecules whose comonomer content is within 50% of the median comonomer content. CDBI was determined from cumulative composition distribution as obtained by TREF (temperature rising elution fraction) analysis.

The TREF analysis was performed on a TREF model 200 series instrument equipped with Infrared detector from Polymer Char. The samples were dissolved in 1,2-dichlorobenzene at 150° C. for 1 h. The following parameters as shown in Table A were used, unless indicated otherwise.

TABLE A

METHOD INFORMATION

| | |
|---|---|
| Dissolution Rate (° C./min) | 40 |
| Stabilization Rate (° C./min) | 40 |
| Crystallization Rate 1 (° C./min) | 0.5 |
| Elution Rate (° C./min) | 1 |
| Cleaning rate (° C./min) | 30 |
| Dissolution temperature (° C.) | 150 |
| Stabilization temperature (° C.) | 95 |
| Crystallization temperature (° C.) | 35 |
| Elution initial temperature (° C.) | 35 |
| Elution temperature (° C.) | 140 |
| Post elution temperature (° C.) | 150 |
| Cleaning temperature (° C.) | 150 |
| Dissolution time (min) | 60 |
| Stabilization time (min) | 45 |
| Crystallization time (min) | 10 |
| Pre-injection time (min) | 10 |
| Soluble Fraction time (min) | 10 |
| Post elution time (min) | 10 |
| High rpm | 200 |
| Low rpm | 100 |
| T on (s) | 5 |
| T off (s) | 120 |
| Dissolution stirring | High |
| Stabilization stirring | High |
| Filling vessels volume (ml) | 20 |
| Filling vessels pick up speed (ml/min) | 40 |
| Filling vessels pump speed (ml/min) | 15 |
| Analysis discarded sample volume (ml) | 2 |
| Analysis discarded waste volume (ml) | 6 |
| Analysis sample volume (ml) | 0.3 |
| Column load volume (ml) | 1.9 |
| Analysis waste volume (ml) | 5 |
| Analysis returned volume (ml) | 1 |
| Analysis pick up rate (ml/min) | 8 |
| Analysis dispensing rate (ml/min) | 3 |
| Cleaning volume (ml) | 30 |
| Cleaning pick up speed (ml/min) | 40 |
| Cleaning pump speed (ml/min) | 15 |
| Top oven temperature (° C.) | 140 |
| Pump Flow (ml/min) | 0.5 |

Calibration for comonomer content was established using several monomodal mPE resins (Composition Distribution Breadth Index, CDBI>94% by classical TREF) of density 0.923-0.955 g/cm³ synthesized with the same comonomer and catalyst system as the polyethylene resin used herein.

The CDC (Composition Distribution Constant) is defined as the CDBI, as obtained by TREF according to the method described above, divided by the Composition Distribution Shape Factor (CDSF) multiplying by 100, analogously to what is described in WO2014/012250;

$$CDC = \frac{CDBI}{CDSF} \times 100$$

wherein, $$CDSF = \frac{\text{Half Width}}{\text{Stdev}}$$

CDSF was determined from the composition distribution profile obtained by TREF. Half Width was defined as the temperature difference between the front temperature and the rear temperature at the half of the maximum peak height, the front temperature at the half of the maximum peak was searched forward from 35° C., while the rear temperature at the half of the maximum peak was searched backward from 119° C., in the case of a well-defined bimodal distribution where the difference in the peak temperatures is equal to or greater than the 1.1 times of the sum of half width of each peak, the half width of the copolymer composition was calculated as the arithmetic average of the half width of each peak.

The standard deviation (Stdev) of the composition distribution profile was obtained according to the following equation, in which $T_W$ is the weighted average peak temperature and $w_T(T)$ is the weight fraction at each temperature (T):

$$Stdev = \sqrt{\int_{35}^{119}(T - T_W)^2 \times w_T(T)}$$

Materials:

The following polymers were used in the examples:

Ethylene with 1-hexene as comonomer was polymerized using ethylene-bis(tetrahydroindenyl)zirconium dichloride as metallocene catalyst in a slurry polymerization process in a liquid full loop reactor to provide a polyethylene M3427 suitable as polyethylene A, having the properties listed in Table 1. Polyethylene M3427 is commercially available from Total Refining & Chemicals as Lumicene® mPE M 3427.

Ethylene with 1-hexene as comonomer was polymerized using ethylene-bis(tetrahydroindenyl)zirconium dichloride as metallocene catalyst in a slurry polymerization process in a liquid full double loop reactor to provide a polyethylene 22ST05 suitable as polyethylene B, having the properties listed in Tables 1 and 2. The polyethylene fraction prepared in Reactor 1 is suitable as polyethylene B2, having the properties listed in Table 2. The polyethylene fraction prepared in Reactor 2 is suitable as polyethylene B1, having the properties listed in Table 2. Polyethylene 22ST05 is commercially available from Total Refining & Chemicals as Lumicene® Supertough 22ST05.

Ethylene with 1-hexene as comonomer was polymerized using ethylene-bis(tetrahydroindenyl)zirconium dichloride as metallocene catalyst in a slurry polymerization process in a liquid full double loop reactor to provide a polyethylene 32ST05 suitable as polyethylene B, having the properties listed in Tables 1 and 3. The polyethylene fraction prepared in Reactor 1 is suitable as polyethylene B2, having the properties listed in Table 2. The polyethylene fraction prepared in Reactor 2 is suitable as polyethylene B1, having the properties listed in Table 3. Polyethylene 32ST05 is commercially available from Total Refining & Chemicals as Lumicene® Supertough 32ST05.

Tables 1-3 show the properties of polyethylenes M3427, 22ST05 and 32ST05.

TABLE 1

|  | Unit | M3427 | 22ST05 | 32ST05 |
| --- | --- | --- | --- | --- |
| Density (23° C.) | g/cm$^3$ | 0.934 | 0.921 | 0.931 |
| MI2 (190° C., 2.16 kg) | g/10 min | 3.1 | 0.5 | 0.5 |
| Hexene content | wt % | 3.0 | 7.0 | 4.3 |
| Melting temperature | ° C. | 123 | 113 | 123 |
| $M_w/M_n$ | — | 2.6 | 3.7 | 3.8 |
| CDBI | % | 78 | 88 | 45 |
| $g_{rheo}$ | — | 0.81 | 0.64 | 0.73 |
| Vicat softening temperature (A120) | ° C. | 121 | 108 | 115 |

TABLE 2

| BIMODAL MPE | | | 22ST05 |
| --- | --- | --- | --- |
| Reactor 1 | MI2 | (g/10 min) | 22.3 |
|  | Density | (g/cm$^3$) | 0.93 |
|  | Contribution | (wt %) | 41.2 |
|  | $M_n$ | kDa | 16.8 |
|  | $M_w$ | kDa | 41.2 |
| Final Product Pellets | MI2 | (g/10 min) | 0.55 |
|  | Density | (g/cm$^3$) | 0.9208 |
|  | $M_n$ | kDa | 28.4 |
|  | $M_w$ | kDa | 109.6 |
| Calculation Reactor 2 | MI2 | g/10 min | 0.06 |
|  | Density | (g/cm$^3$) | 0.914 |
|  | $M_n$ | kDa | 62.6 |
|  | $M_w$ | kDa | 162.7 |

TABLE 3

| BIMODAL MPE | | | 32ST05 |
| --- | --- | --- | --- |
| Reactor 1 | MI2 | (g/10 min) | 22.6 |
|  | Density | (g/cm$^3$) | 0.957 |
|  | Contribution | (wt %) | 43.1 |
|  | $M_n$ | kDa | 16.5 |
|  | $M_w$ | kDa | 40.4 |
| Final Product Pellets | MI2 | (g/10 min) | 0.55 |
|  | Density | (g/cm$^3$) | 0.9303 |
|  | $M_n$ | kDa | 24.7 |
|  | $M_w$ | kDa | 94.1 |
| Calculation Reactor 2 | MI2 | g/10 min | 0.05 |
|  | Density | (g/cm$^3$) | 0.910 |
|  | $M_n$ | kDa | 51.2 |
|  | $M_w$ | kDa | 133.0 |

PPA was a fluoroelastomer processing aid from Argus Additive with reference ARX 741 PA 01 LD.

The masterbatch was based on an LDPE carrier, comprising pigments and UV stabilizers. It is commercially available from BASF under the trade name Sicolen® Green 94-010365.

Results:
TREF Analysis

Figure 1B:
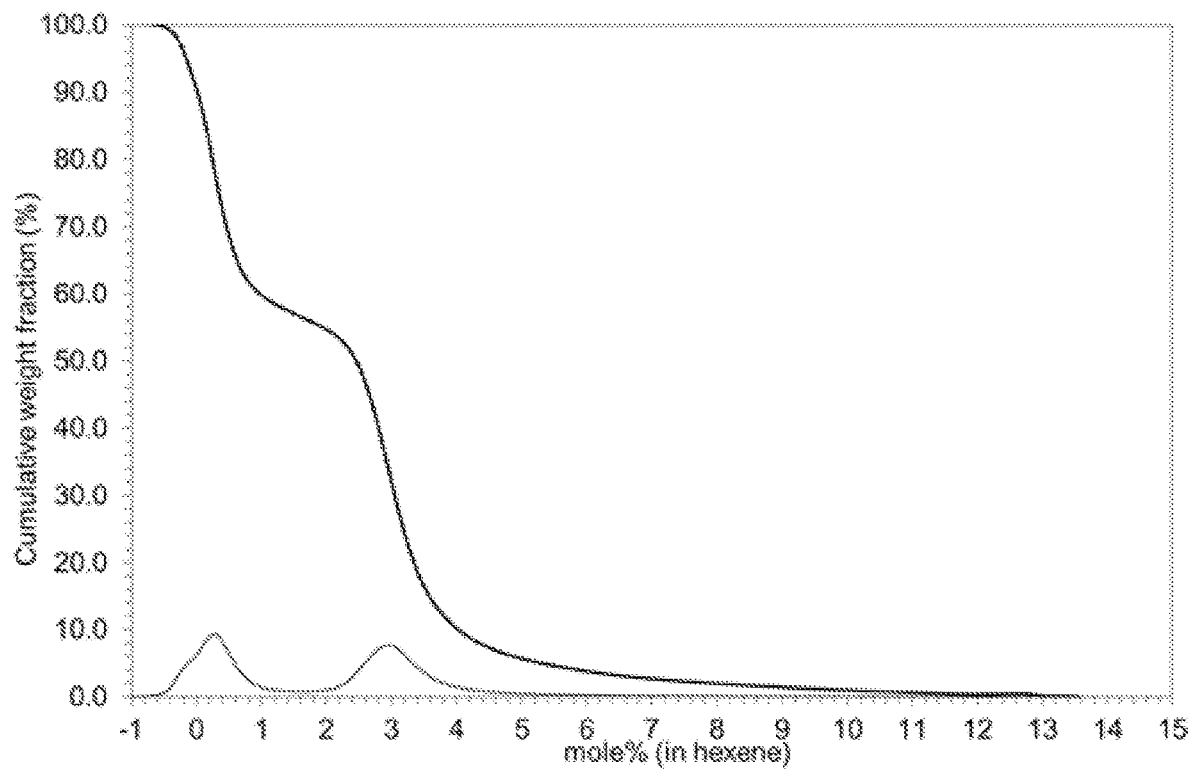
FIG. 1B represents a graph plotting the cumulative weight fraction (normalized to 100) (in %) as a function of the molar comonomer content (in mol %) for Lumicene® Supertough 32ST05.
Figure 2:
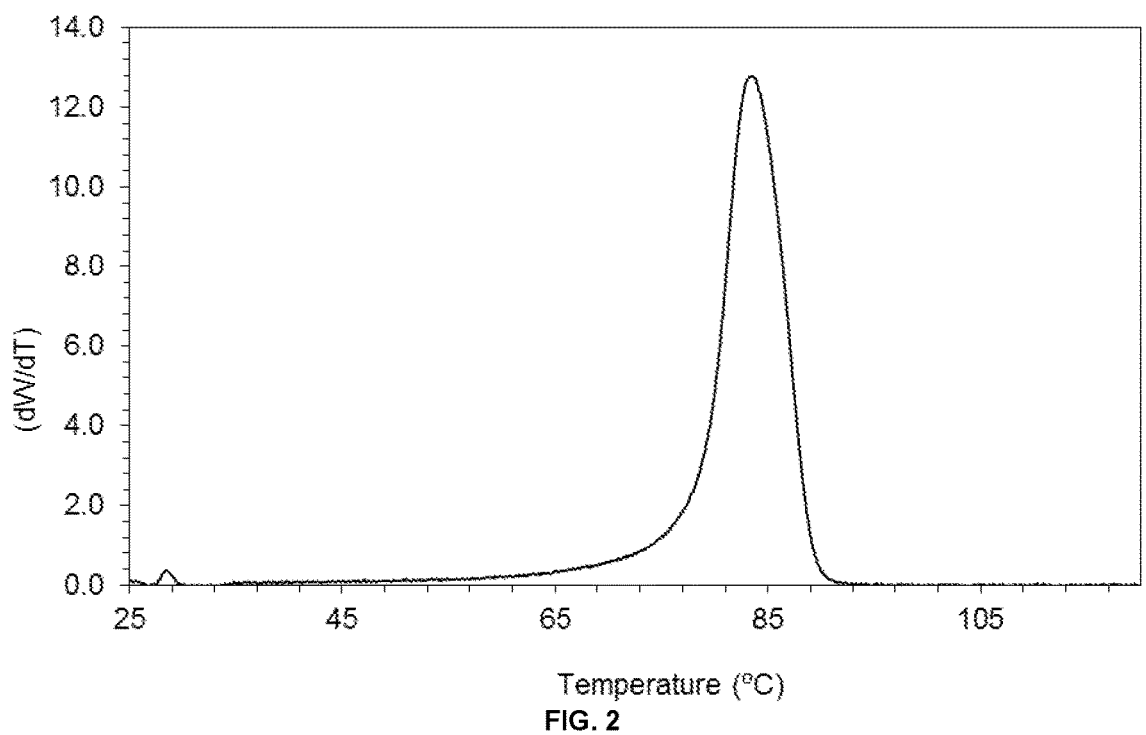
FIG. 2 represents a graph plotting a TREF (temperature rising elution fractionation) profile (dW/dT (%/° C.); elution rate at 1° C./min) as a function of temperature for Lumicene® Supertough 22ST05: Peak 1=83.4° C.; Area=98.8%, Soluble fraction=0.5%.
Figure 3:
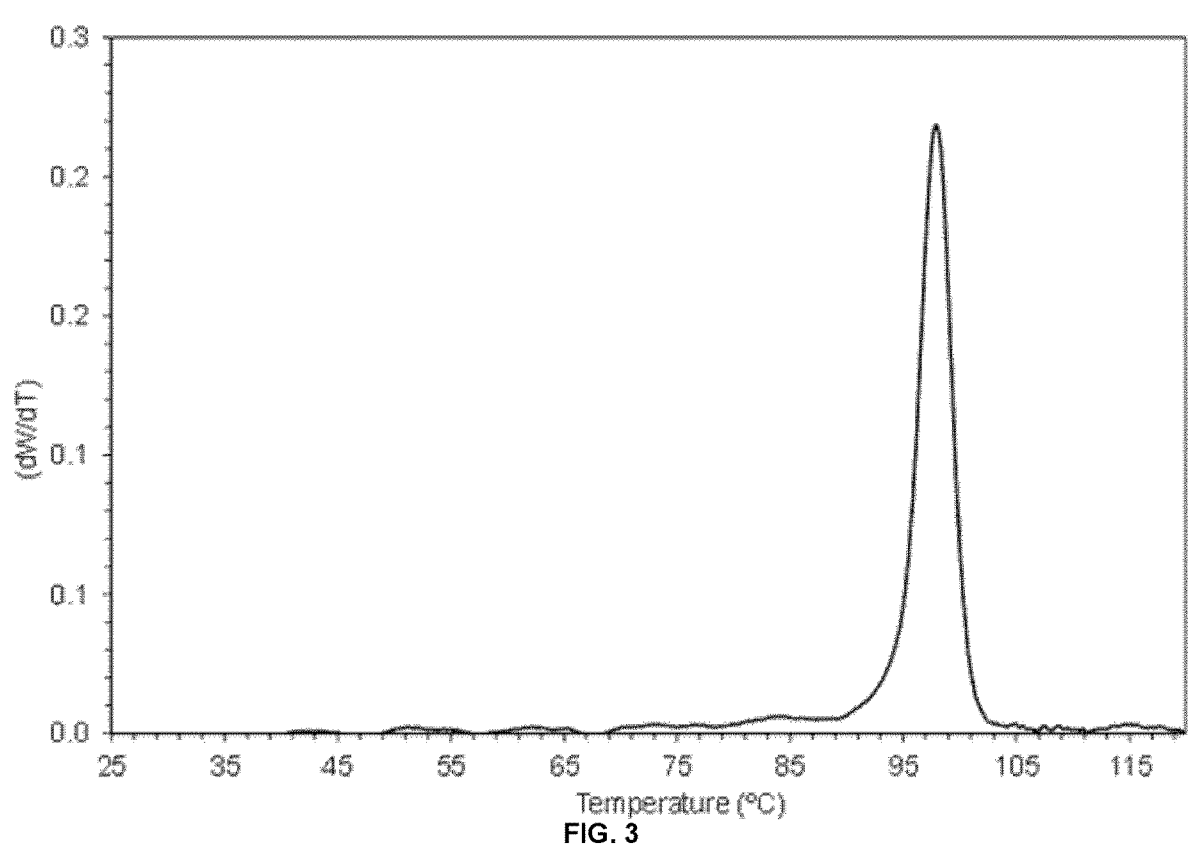
FIG. 3 represents a graph plotting a TREF (temperature rising elution fractionation) profile (dW/dT (%/° C.); elution rate at 6° C./min) as a function of temperature for Lumicene® M3427.

Lumicene® Supertough 32ST05, Lumicene® Supertough 22ST05, and Lumicene® M3427 were fractionated according to their chemical compositions by a Temperature Rising Elution Fractionation (TREF) process. The results are shown in FIGS. 1, 2, and 3. FIG. 1 shows the TREF distribution profile of Lumicene® Supertough 32ST05, while FIG. 2 shows the TREF distribution profile of Lumicene® Supertough 22ST05, and FIG. 3 shows the TREF distribution profile of Lumicene® M3427. While the TREF profiles in FIGS. 1A, 1B and 2 were obtained at an elution rate of 1° C./min, the TREF profile in FIG. 3 was obtained at an elution rate of 6° C./min.

For each of the polymers tested, the temperature of each of the peaks observed in the TREF distribution curves, the percentage of the area under said peaks and their half width, as well as the area of the soluble fraction, and the standard deviation from the weighted average peak temperature ($T_w$) are displayed in Table 4.

TABLE 4

|  | Peak 1 | | | Peak 2 | | | Soluble | Standard |
| --- | --- | --- | --- | --- | --- | --- | --- | --- |
|  | Temp (° C.) | Area (%) | Half width (° C.) | Temp (° C.) | Area (%) | Half width (° C.) | fraction Area (%) | deviation Temp (° C.) |
| Lumicene ® Supertough 32ST05 | 81.9 | 54.8 | 5.3 | 96.3 | 43.7 | 4.2 | 0.4 | 11.0 |
| Lumicene ® Supertough 22ST05 | 83.4 | 98.8 | 6.4 | — | — | — | 0.5 | 7.8 |
| Lumicene ® M3427 | 97.8 | >99 | 3.2 | — | — | — | nd | 8.4 | nd = not determined

For the calculation of the CDBI the solubility distribution curve (for e.g. FIG. 1A) which plots the weight fraction of the polymer that was solubilized as a function of temperature was converted to a weight fraction versus composition distribution curve (for e.g. FIG. 1B), where the CDBI was determined by establishing the weight percentage of a sample that has comonomer content within 50% of the median comonomer content on each side of the median.

For each of the polymers tested, the median copolymer content (Cmed) and the ±50% Cmed as well as the corresponding values on the cumulative curve and the CDBI are displayed in Table 5. The median copolymer content, Cmed, corresponds to the content (in mol %) at the point where the cumulative integral equals 50% (or 0.5 when normalized to 1). The difference between the values of the cumulative integral at compositions 0.5 Cmed and 1.5 Cmed is the CDBI of the copolymer. To calculate the CDC, the CDBI was divided by the ratio of the half width of the composition distribution profile peak temperature(s) divided by the standard deviation of the composition distribution profile from the weighted average peak temperature, and multiplied by 100.

settings: Melt temperature: 230° C.—Yarn type: C—Line speed: 120 m/min—Water cooling bath at 35° C.—three oven setup for stretching, relaxation, and thermo fixation with settings given in Table 7.

A color & anti-UV masterbatch was added (6 wt %) and a Polymer Processing Aid was added (1 wt %), both prior to extrusion, the combination of which is suitable as polyethylene-based composition C, present at 7 wt %.

Comparative Example 2

Monofilaments from Lumicene® Supertough 32ST05 were prepared under the same conditions outlined in comparative example 1. Due to the melt fracture, the monofilaments are not suitable as artificial turf yarn.

The compositions, yarn properties, and processing performance of comparative examples 1 and 2 are listed in Table 7, whereby wt % is the % by weight of each polyethylene fraction based on the total weight of the polyethylene composition. Melt fracture was assessed visually by the appearance of sharkskin on the extruded yarn. For the

TABLE 5

|  | Cmed (median copolymer content) mol % | 0.5 × Cmed = A mol % | 1.5 × Cmed = B mol % | A reported on the cumulative curve % | B reported on the cumulative curve % | CDBI % | CDC |
|---|---|---|---|---|---|---|---|
| Lumicene® Supertough 32ST05 | 2.45 | 1.23 | 3.67 | 58.3 | 13.5 | 44.8 | 103.3 |
| Lumicene® Supertough 22ST05 | 2.74 | 1.37 | 4.11 | 100 | 11.6 | 88.4 | 107.6 |
| Lumicene® M3427 | 0.83 | 0.42 | 1.25 | 94.6 | 16.4 | 78.2 | 204.5 |

Blends of Lumicene® Supertough 22ST05 with Lumicene® M3427 were prepared by melt blending at 230° C. using a Clextral BC 45 co-rotating twin screw extruder (50 mm; L/D 32). The characteristics of these blends are shown in Table 6.

TABLE 6

|  | Unit | Blend 1 | Blend 2 |
|---|---|---|---|
| 22ST05 | wt % | 20 | 50 |
| M3427 | wt % | 80 | 50 |
| Density | g/cm³ | 0.9316 | 0.9269 |
| MI2 | g/10 min | 2.23 | 1.20 |
| MI5 | g/10 min | 6.94 | 3.96 |
| $M_n$ | kDa | 26.5 | 27.1 |
| $M_w$ | kDa | 70.5 | 80.3 |
| $M_z$ | kDa | 143.6 | 184.2 |
| D | — | 2.7 | 3 |
| D' | — | 2 | 2.3 |
| PI | — | NA | 6.3 |
| $g_{rheo}$ | — | 0.84 | 0.78 |
| $T_m$ | ° C. | 120.9 | 119.1 |
| Melting enthalpy | J/g | 154.5 | 140.5 |
| $T_{onset}$ | ° C. | 116.9 | 115.7 |

Comparative Example 1

Figure 4:
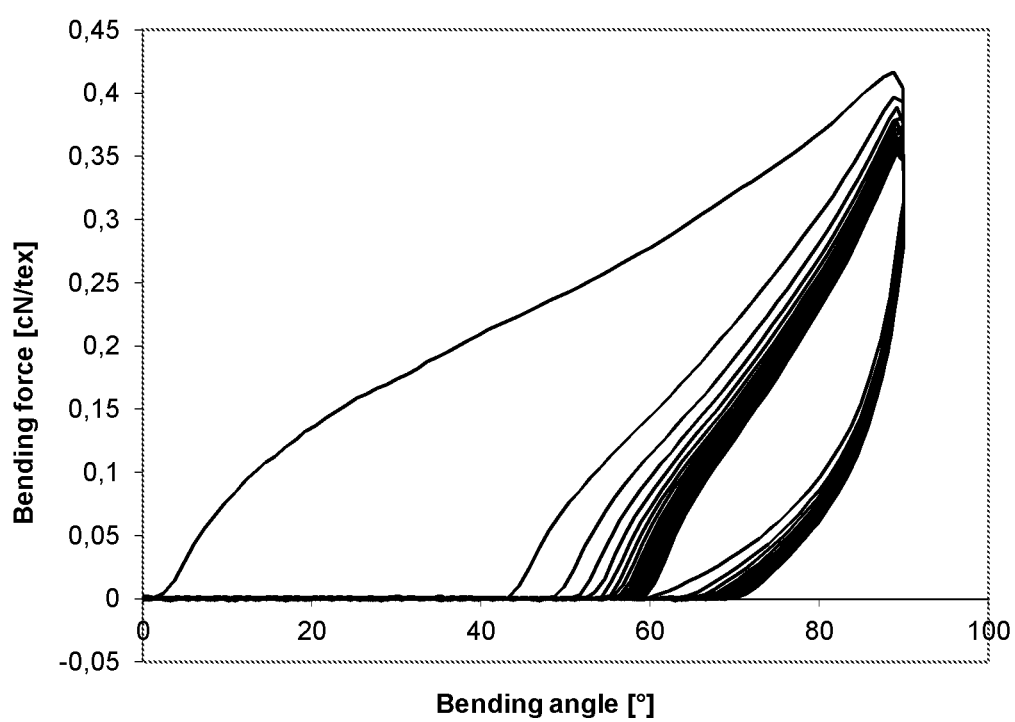
FIG. 4 represents a graph plotting a typical hysteresis loop obtained when performing 20 bending cycles of a single monofilament.

Monofilaments suitable as artificial turf yarns from Lumicene® M3427 were prepared on a monofilament compact spinning line by Oerlikon Barmag with the following line Lisport test (number of cycles before visual deterioration by fibrillation of the yarn) according to EN 15306, the yarns are tufted into an artificial turf carpet, filled with sand and rubber infill. Lisport tests and interpretation of results were carried out by Labosport UK for comparative example 1, and by Universiteit Gent (ERCAT) for comparative example 3 and examples 1 and 2. Resilience properties of single monofilaments have been investigated using a cyclic bending test similar to the method described in: Schoukens, G. Developments in textile sports surfaces. In *Advances in carpet manufacture*; Goswami, K. K., Eds.; Woodhead Publishing Limited, 2009; pp 102-137. It consists of bending a single monofilament to a 90° angle at a speed of 30°/s, holding it for 1 second at 90°, followed by a return to 0° at 30°/s, and holding it at 0° for 1 second before starting the next cycle. One experiment comprises of 20 cycles and for each fiber the test is repeated 5 times, each time with a new specimen. The force was measured during the bending experiment and a hysteresis loop was obtained as shown in FIG. 4. The resilience was determined by the recovery angle at the 20$^{th}$ cycle when the force becomes zero. A lower recovery angle indicated a better resilience of the monofilament. Tenacity and elongation at break of filaments were determined by tensile test according to EN 13864. Yarn shrinkage was measured by exposure of the sample for 2 minutes in a 90° C. hot air oven according to EN13844.

TABLE 7

|  | Comparative Example 1 | Comparative Example 2 |
|---|---|---|
| wt % M3427 | 93 | 0 |
| wt % 32ST05 | 0 | 93 |
| wt % Blend 1 | 0 | 0 |
| wt % Blend 2 | 0 | 0 |
| wt % masterbatch + PPA | 7 | 7 |
| Line speed (m/min) | 120 | 120 |
| Stretch oven temperature (° C.) | 100 | 100 |
| Stretch ratio | 4.31 | 4.35 |
| Relaxation oven temperature (° C.) | 115 | 115 |
| Relaxation ratio | 0.82 | 0.81 |
| Thermo fixation oven temperature (° C.) | 115 | 115 |
| Fixation ratio | 1.03 | 1.03 |
| Total draw ratio | 3.63 | 3.63 |
| Yarn Titer (dtex) | 2072 | nm* |
| Tenacity (cN/dtex) | 1.23 | nm* |
| Elongation at break (%) | 129.6 | nm* |
| Yarn shrinkage (%) | 2.2 | nm* |
| Melt fracture | No | Yes |
| Die Head Pressure (bar) | 97 | 145 |
| Lisport test (cycles) | 60,000 | nm* | nm = not measured.
*measurement not possible due to melt fracture

Comparative Example 3

Monofilaments from Lumicene® M3427 are prepared on a laboratory monofilament extrusion line with the following line settings: Melt temperature: 230° C.—Yarn type: diamond—Line speed: 21.5 m/min—Water cooling bath at 25° C.—one oven setup for stretching only, with settings given in Table 8. A color and anti-UV masterbatch was added (6 wt %) and a Polymer Processing Aid is added (1 wt %), both prior to extrusion, the combination of which is suitable as polyethylene-based composition C, present at 7 wt %.

Example 1

Monofilaments from Blend 1 are prepared under the same conditions outlined in comparative example 3.

Example 2

Monofilaments from Blend 2 are prepared under the same conditions outlined in comparative example 3.

The compositions, yarn properties, and processing performance of examples 1 and 2 and comparative example 3 are listed in Table 8. Yarn properties, and processing performance are measured as described above for comparative examples 1 and 2. The Lisport performance of the yarn prepared in comparative example 3 was markedly lower compared to comparative example 1 even though both yarns are based on the same formulation. The absence of yarn relaxation and thermo fixation was responsible for this difference and this factor should be borne in mind when comparing to examples 1 and 2.

From the data in Table 8 it can be concluded that the inventive polyethylene compositions exhibit markedly improved durability and resilience properties, whilst still processable on artificial grass monofilament extrusion equipment.

TABLE 8

|  | Comparative Example 3 | Example 1 | Example 2 |
|---|---|---|---|
| wt % M3427 | 93 | 0 | 0 |
| wt % Blend 1 | 0 | 93 | 0 |
| wt % Blend 2 | 0 | 0 | 93 |
| wt % masterbatch + PPA | 7 | 7 | 7 |
| Line speed (m/min) | 21.5 | 21.5 | 21.5 |
| Stretch oven temperature (° C.) | 95 | 95 | 95 |
| Stretch ratio | 4.3 | 4.3 | 4.3 |
| Total draw ratio | 4.3 | 4.3 | 4.3 |
| Yarn Titer (dtex) | 2270 | 2460 | 2422 |
| Tenacity (cN/dtex) | 1.33 | 1.42 | 1.44 |
| Elongation at break (%) | 144 | 129 | 96 |
| Yarn shrinkage (%) | 12.3 | 11.7 | 14.8 |
| Melt fracture | No | No | No |
| Die Head Pressure (bar) | 54 | 62 | 76 |
| Lisport test (cycles) | 35,000 | 80,000 | 85,000 |
| Resilience recovery angle (°) | 69.8 | 67.6 | 67.6 |

The invention claimed is:

1. A polyethylene composition comprising:
   a) at least 45% to at most 95% by weight of a metallocene-catalyzed polyethylene A, wherein % by weight is based on the total weight of the polyethylene composition;
   wherein polyethylene A has a density of at least 0.916 g/cm$^3$ to at most 0.940 g/cm$^3$, as measured according to ISO 1183-2:2004 at a temperature of 23° C., and a melt index MI2 of at least 1.5 g/10 min to at most 4.0 g/10 min, as measured according to ISO 1133 Procedure B at a temperature of 190° C. and a load of 2.16 kg;
   b) at least 5% to at most 55% by weight of a metallocene-catalyzed polyethylene B, wherein % by weight is based on the total weight of the polyethylene composition; wherein said metallocene-catalyzed polyethylene B comprises:
   b1) at least 45% to at most 75% by weight of a metallocene-catalyzed polyethylene B1, wherein % by weight is based on the total weight of the metallocene-catalyzed polyethylene B;
   wherein polyethylene B1 has a density of at most 0.918 g/cm$^3$, as measured according to ISO 1183-2:2004 at a temperature of 23° C., and a melt index MI2 lower than the melt index MI2 of polyethylene A, as measured according to ISO 1133 Procedure B at a temperature of 190° C. and a load of 2.16 kg; and
   b2) at least 25% to at most 55% by weight of a metallocene-catalyzed polyethylene B2, wherein % by weight is based on the total weight of the metallocene-catalyzed polyethylene B;
   wherein polyethylene B2 has a density higher than the density of polyethylene B1, as measured according to ISO 1183-2:2004 at a temperature of 23° C.; and wherein the melt index MI2 of polyethylene B2 is higher than the melt index MI2 of polyethylene B1, as measured according to ISO 1133 Procedure B at a temperature of 190° C. and a load of 2.16 kg, and
   wherein the polyethylene B comprises a multimodal molecular weight distribution; a density of at least 0.910 g/cm$^3$ to at most 0.945 g/cm$^3$; a melt index MI2 of 0.2 g/10 min to at most 1.5 g/10 min, and a molecular weight distribution $M_w/M_n$ of at least 2.8 to at most 6.0, as measured using gel permeation chromatography, with $M_w$ being the weight-average molecular weight and $M_n$ being the number-average molecular weight.

2. The polyethylene composition according to claim 1, wherein the polyethylene A has a monomodal molecular weight distribution.

3. The polyethylene composition according to claim 1, wherein the polyethylene A has a rheology long chain branching index $g_{rheo}$ of at most 0.9.

4. The polyethylene composition according to claim 1, wherein the polyethylene A has a Composition Distribution Constant (CDC) of at least 150 and the soluble fraction is at most 1.00%, as analyzed by TREF with a cooling rate of 1° C./hour.

5. The polyethylene composition according to claim 1, wherein the Vicat softening temperature $T_v$ of the polyethylene A expressed in ° C., as measured according to ISO 306:2013 method A120, satisfies the relationship $T_v>825 \times d-654$, wherein d is the density expressed in g/cm$^3$, as measured according to ISO 1183-2:2004 at a temperature of 23° C.

6. The polyethylene composition according to claim 1, wherein the polyethylene B1 has a melt index MI2 of at most 1.0 g/10 min.

7. The polyethylene composition according to claim 1, wherein the ratio of the $M_w$ of polyethylene B1/$M_w$, of polyethylene B2 is at least 2.5 to at most 6.0, as measured using gel permeation chromatography, with $M_w$ being the weight-average molecular weight.

8. The polyethylene composition according to claim 1, wherein the polyethylene B has a rheology long chain branching index $g_{rheo}$ of at most 0.9.

9. The polyethylene composition according to claim 1, wherein the Vicat softening temperature $T_v$ of the polyethylene B expressed in ° C., as measured according to ISO 306:2013 method A120, satisfies the relationship $T_v>825 \times d-654$, wherein d is the density expressed in g/cm$^3$, as measured according to ISO 1183-2:2004 at a temperature of 23° C.

10. The polyethylene composition according to claim 1, wherein the polyethylene composition further comprises at least 0.01% to at most 10% by weight of a polyethylene-based composition C, wherein the polyethylene-based composition C comprises one or more additives selected from the group comprising antioxidants, UV stabilizers, pigments, processing aids, acid scavengers, lubricants, antistatic agents, fillers, nucleating agents, or clarifying agents, based on the total weight of the polyethylene composition.

11. The polyethylene composition according to claim 1, wherein the polyethylene composition has a melt index MI2 of at least 0.5 g/10 min to at most 4.5 g/10 min, as measured according to ISO 1133 Procedure B at a temperature of 190° C. and a load of 2.16 kg.

12. The polyethylene composition according to claim 1 wherein the polyethylene composition has a density of at least 0.916 g/cm$^3$ to at most 0.940 g/cm$^3$, as measured according to ISO 1183-2:2004 at a temperature of 23° C.

13. A fiber comprising the polyethylene composition according to claim 1, wherein the fiber is a monofilament, slit film, or tape.

14. An artificial turf comprising one or more fibers according to claim 13.

* * * * *